(12) United States Patent  
Kiyama et al.

(10) Patent No.: US 10,891,123 B2  
(45) Date of Patent: Jan. 12, 2021

(54) IN-VEHICLE SOFTWARE DISTRIBUTION SYSTEM, IN-VEHICLE SOFTWARE DISTRIBUTION SERVER, AND IN-VEHICLE SOFTWARE DISTRIBUTION METHOD

(71) Applicant: HITACHI, LTD., Tokyo (JP)

(72) Inventors: Noboru Kiyama, Tokyo (JP); Atsushi Katou, Tokyo (JP); Haruki Oishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 164 days.

(21) Appl. No.: 16/200,681

(22) Filed: Nov. 27, 2018

(65) Prior Publication Data

US 2019/0163466 A1 May 30, 2019

(30) Foreign Application Priority Data

Nov. 30, 2017 (JP) .................................. 2017-231277

(51) Int. Cl.
*G06F 8/65* (2018.01)
*H04W 4/44* (2018.01)
*G07C 5/00* (2006.01)

(52) U.S. Cl.
CPC ............... *G06F 8/65* (2013.01); *G07C 5/008* (2013.01); *H04W 4/44* (2018.02)

(58) Field of Classification Search
CPC . G06F 8/65; G07C 5/008; G07C 5/00; H04W 4/44
USPC ......................................................... 717/168
See application file for complete search history.

(56) References Cited

U.S. PATENT DOCUMENTS

| 2005/0256614 A1* | 11/2005 | Habermas | ................. G06F 8/65 701/1 |
| 2015/0113520 A1 | 4/2015 | Kotani et al. | |
| 2015/0169311 A1* | 6/2015 | Dickerson et al. | ....... G06F 8/65 717/170 |

(Continued)

FOREIGN PATENT DOCUMENTS

JP 5864510 B 2/2016

OTHER PUBLICATIONS

Extended European Search Report received in corresponding European Application No. 18208749.4 dated Apr. 9, 2019.

*Primary Examiner* — Wei Y Zhen
*Assistant Examiner* — Mohammed N Huda
(74) *Attorney, Agent, or Firm* — Mattingly & Malur, PC

(57) ABSTRACT

Control for the flexible distribution of update software is realized.
An in-vehicle software distribution system 1 is configured comprising an in-vehicle software distribution server (telematics center 10) which manages updates to an identical function by means of a campaign for an in-vehicle system (an engine ECU 241, for example) of a plurality of vehicles 20 and distributes software of the campaign remotely to target vehicles, a terminal 30, and a software update apparatus 210 which is mounted in each of the plurality of vehicles 20. Furthermore, in the telematics center 10, a campaign management unit 112 categorizes the campaign target vehicles into groups based on a predetermined criterion and creates a plurality of sub-campaigns which are subordinate to the campaign for each of the categorized groups, and a software distribution unit (an update software distribution unit 113) distributes software remotely to the target vehicles for each of the sub-campaigns.

11 Claims, 17 Drawing Sheets

(56) References Cited

U.S. PATENT DOCUMENTS

2015/0220321 A1* 8/2015 Jung .................... G06F 8/65
717/169
2016/0196132 A1* 7/2016 Searle et al. ............ G06F 8/65
717/173

* cited by examiner

FIG.3

| VIN 1221 | ECU-ID 1222 | SERIAL ID 1223 | SOFTWARE VERSION 1224 | UPDATE DATE AND TIME 1225 |
|---|---|---|---|---|
| 9GJH | Engine_MY15 | E17D33F | 12.1.3 | 2017/10/25 13:36:34 |
| 9GJH | Steer_16JP | B99ZM1A | 5.1.1 | 2017/10/25 13:36:34 |
| 7RTM | Engine_MY15 | Z97IA73L | 12.0.8 | 2017/10/21 08:52:14 |
| ... | ... | ... | ... | ... |

| MAIN CAMPAIGN ID 1231 | ECU-ID 1232 | CRITICAL FLAG 1233 | UPDATE TARGET COUNT 1234 | UPDATE COMPLETION COUNT 1235 | UPDATE DATE AND TIME 1236 |
|---|---|---|---|---|---|
| M012 | Engine_MY15 | True | 7567 | 99383 | 2017/10/29 19:08:22 |
| M705 | Steer_16JP | False | 88618 | 107543 | 2017/10/30 13:13:13 |
| M338 | Engine_MY14EU | True | 31206 | 270197 | 2017/10/31 08:52:14 |
| ... | ... | ... | ... | ... | ... |

| TEST CAMPAIGN ID 1241 | REFERENCE SOURCE MAIN CAMPAIGN ID 1242 | TEST VEHICLE VIN 1243 | TARGET REGION 1244 | UPDATE FILE NAME 1245 | APPLIED VERSION 1246 | VERIFICATION HASH VALUE 1247 | UPDATE DATE AND TIME 1248 |
|---|---|---|---|---|---|---|---|
| T45M012 | M012 | 9GJH | JP | APA_ver13 | 12.1.4 | A052D4 | 2017/10/28 18:32:14 |
| T13M012 | M012 | 7RTM | US | B73H_v5 | 12.0.9 | 4DEC28 | 2017/10/28 11:16:54 |
| T82M338 | M338 | 6ABC | EU | CC8Y_v2 | 6.0.1 | BA54F7 | 2017/10/30 08:42:34 |
| ... | ... | ... | ... | ... | ... | ... | ... |

| DISTRIBUTION CAMPAIGN ID | REFERENCE SOURCE MAIN CAMPAIGN ID | REFERENCE SOURCE TEST CAMPAIGN ID | TARGET REGION | DISTRIBUTION START DATE AND TIME | UPDATE TARGET COUNT | UPDATE COMPLETION COUNT | UPDATE DATE AND TIME |
|---|---|---|---|---|---|---|---|
| D98M012 | M012 | T45M012 | JP | 2017/11/01 00:00:00 | 1024 | 28456 | 2017/10/29 09:59:04 |
| D33M012 | M012 | T13M012 | US | 2017/11/01 15:00:00 | 6543 | 70927 | 2017/10/29 19:08:22 |
| D14M338 | M338 | T82M338 | EU | 2017/11/3 12:00:00 | 8903 | 56712 | 2017/10/31 08:52:14 |
| ... | ... | ... | ... | ... | ... | ... | ... |

FIG.7

| DISTRIBUTION CAMPAIGN ID 1261 | VIN 1262 | STATUS 1263 | UPDATE DATE AND TIME 1264 |
|---|---|---|---|
| D98M012 | Z7GH | UPDATE COMPLETE | 17/11/02 20:58:56 |
| D98M012 | Y12Q | DOWNLOAD COMPLETE | null |
| D14M338 | 4PVK | USER PERMISSION NOT ACQUIRED | null |
| ... | ... | ... | ... |

CAMPAIGN MANAGEMENT SCREEN   [ CREATE NEW MAIN CAMPAIGN ]

(−) MAIN CAMPAIGN ID    M012    [ CREATE NEW TEST CAMPAIGN ]    3311

| ECU ID | Engine_MY15 |
|---|---|
| CRITICAL FLAG | True |
| UPDATE TARGET COUNT | 7567 |
| UPDATE COMPLETION COUNT | 99383 |
| UPDATE DATE AND TIME | 2017/10/29 19:08:22 |

3312

(−) TEST CAMPAIGN ID    T45M012    [ CREATE NEW DISTRIBUTION CAMPAIGN ]

| TEST VEHICLE VIN | 9GJH |
|---|---|
| TARGET REGION | JP |
| UPDATE FILE NAME | APA_ver13 |
| APPLIED VERSION | 12.1.4 |
| VERIFICATION HASH VALUE | A052D4 |
| UPDATE DATE AND TIME | 2017/10/28 18:32:14 |

3313

(+) TEST CAMPAIGN ID    T13M012    [ CREATE NEW DISTRIBUTION CAMPAIGN ]

(−) DISTRIBUTION CAMPAIGN ID    D98M012    3314

| REFERENCE SOURCE TEST CAMPAIGN ID | T45M012 |
|---|---|
| TARGET REGION | JP |
| DISTRIBUTION START DATE AND TIME | 2017/11/01 00:00:00 |
| UPDATE TARGET COUNT | 1024 |
| UPDATE COMPLETION COUNT | 28456 |
| UPDATE DATE AND TIME | 2017/10/29 09:59:04 |

(+) DISTRIBUTION CAMPAIGN ID    D33M012

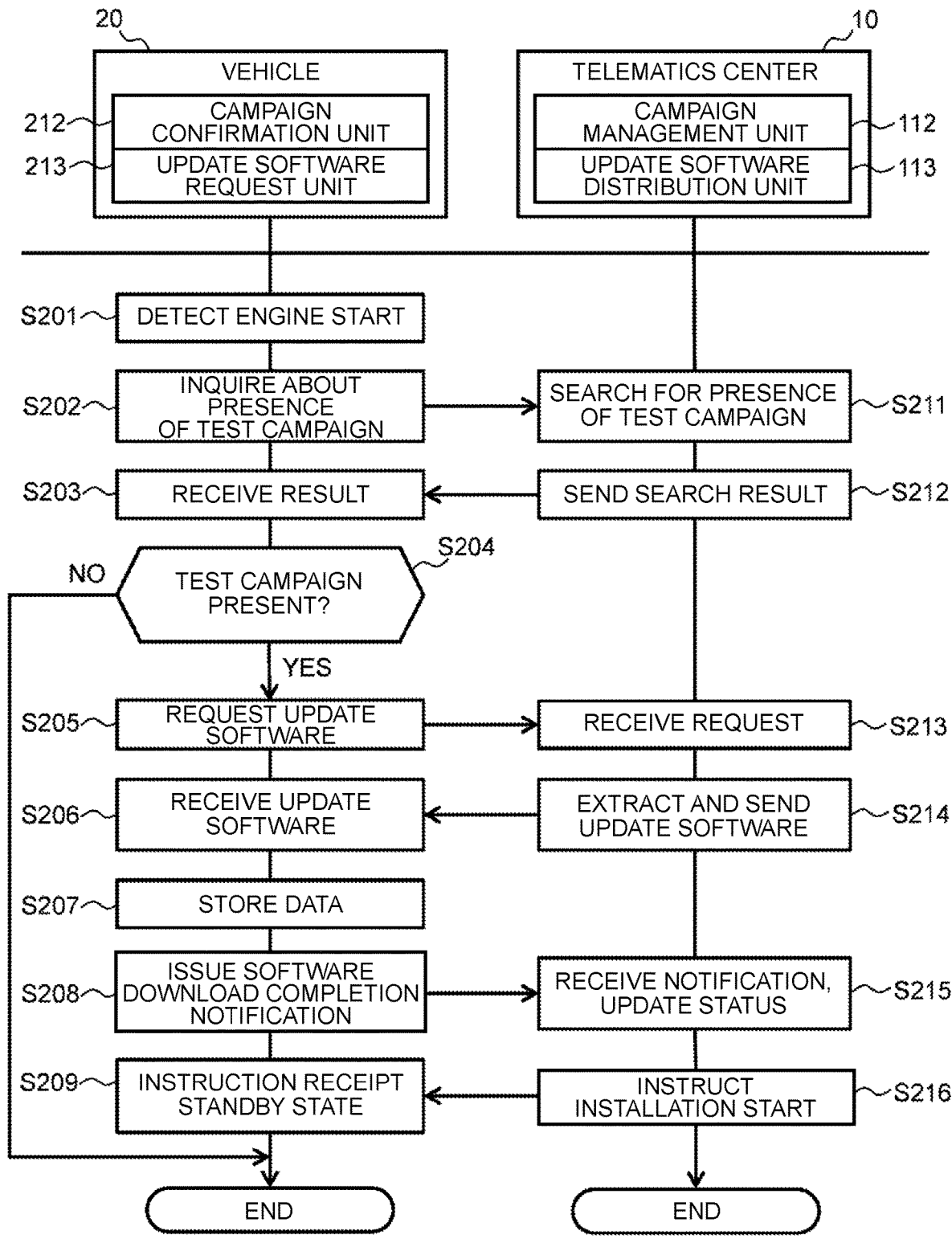

FIG.16

DISTRIBUTION CAMPAIGN CREATION SCREEN

| VIN | VEHICLE MODEL ID | CURRENT POSITION REGION | USAGE FRE-QUENCY | UPDATE DATE AND TIME |
|---|---|---|---|---|
| 7RTM | N-Bok | US | MONTHLY | 2017/10/21 08:56:50 |
| 3HEW | X-Veh | EU | WEEKLY | 2017/10/26 10:33:22 |
| 9GJH | X-Veh | JP | DAILY | 2017/10/27 14:47:01 |
| ⋮ | ⋮ | ⋮ | ⋮ | ⋮ |

- 3322 DISTRIBUTION CAMPAIGN SEGMENT COUNT — 3 — MODIFY (3325)
- 3323 DISTRIBUTION START DATE AND TIME OF FIRST DISTRIBUTION CAMPAIGN — 2017/11/01 00:00:00 — MODIFY (3326)
- 3324 DISTRIBUTION START DATE AND TIME INTERVAL OF SECOND AND SUBSEQUENT DISTRIBUTION CAMPAIGNS — ONE WEEK — MODIFY (3327)
- 3328 CREATE DISTRIBUTION CAMPAIGN

IN-VEHICLE SOFTWARE DISTRIBUTION SYSTEM, IN-VEHICLE SOFTWARE DISTRIBUTION SERVER, AND IN-VEHICLE SOFTWARE DISTRIBUTION METHOD

TECHNICAL FIELD

The present invention relates to an in-vehicle software distribution system, in-vehicle software distribution server, and in-vehicle software distribution method, and the like, and is preferably applied to an in-vehicle software distribution system, in-vehicle software distribution server, and in-vehicle software distribution method which implement remote software updates to devices mounted in vehicles such as automobiles.

BACKGROUND ART

In recent years, the scale of software which is installed in automobile electric control units (ECUs) has been increasing due to advances in driving support functions and self-driving technology. Furthermore, because of this increase in the scale of software, there has also been a trend toward an increase in the number of recalls due to software problems and in the number of vehicles that need to be handled in a single recall. On the other hand, due to the development of communication networks, connected cars for which automobiles are wirelessly connected to center systems and the like, are also showing signs of becoming popularized.

In such a climate, wireless remote software update technology which is used for conventional cell phones and televisions and the like is being applied to automobiles and there are increased demands on remote software update technology for automobiles which remotely updates automobile ECU software.

For example, PTL 1 discloses an information processing system which performs in-vehicle software updates via a network. In the information processing system disclosed in PTL 1, memory hash values which have been applied to update software in an automobile ECU are sent to a center, and by performing a comparison of these hash values with pre-registered verification hash values, it is possible to confirm on the center side whether a software update in a target automobile ECU has been completed normally.

CITATION LIST

Patent Literature

[PTL 1] Japanese Patent Publication No. 5864510.

SUMMARY OF THE INVENTION

Problems to be Solved by the Invention

Here, the information processing system disclosed in PTL 1 is based on the premise that the same software is uniformly distributed to ECUs or vehicles which have the same ECU ID (an identifier that makes it possible to uniquely specify the ECU). However, in actual software updates, cases include those where software is distributed only to specific vehicles for verification purposes and cases where software that is obtained by changing only a portion of data based on different regulations according to the countries and areas (regions) where the vehicles are located and so forth, is distributed. In the information processing system disclosed in PTL 1, there is a problem in that it is not clear how to control software distribution in a situation where software is not distributed uniformly to all the automobiles as mentioned hereinabove (a situation where the same software is not distributed all at once).

The present invention was devised in view of the foregoing points, and an object of this invention is to propose an in-vehicle software distribution system, in-vehicle software distribution server, and in-vehicle software distribution method which are capable of implementing control for flexible and not uniform distribution of update software such as the distribution of software only to specific vehicles for verification purposes and the distribution of software that differs according to the region.

Means to Solve the Problems

In order to solve this problem, the present invention is an in-vehicle software distribution system which controls updates to an identical function for in-vehicle systems of a plurality of vehicles, comprising: an in-vehicle software distribution server (telematics center) which manages updates to the identical function by means of a campaign (main campaign) and distributes software remotely to vehicles targeted by the campaign based on the campaign, a terminal which performs I/Os to/from the in-vehicle software distribution server, and a software update apparatus which is mounted in each of the plurality of vehicles, downloads the software that has been distributed by the in-vehicle software distribution server, and installs the software in target in-vehicle systems. In this in-vehicle software distribution system, the in-vehicle software distribution server comprises a campaign management unit which categorizes the campaign target vehicles into groups based on a predetermined criterion and creates a plurality of sub-campaigns (for example, a test campaign and a distribution campaign) which are subordinate to the campaign for each of the categorized groups; and a software distribution unit which, for each of the sub-campaigns, distributes software remotely to vehicles targeted by the sub-campaigns based on the sub-campaigns.

In addition, in order to solve this problem, the present invention is an in-vehicle software distribution server which manages updates to an identical function by means of a campaign (main campaign) for in-vehicle systems of a plurality of vehicles and distributes software remotely to vehicles targeted by the campaign based on the campaign, comprising: a campaign management unit which categorizes the campaign target vehicles into groups based on a predetermined criterion and creates a plurality of sub-campaigns (for example, a test campaign and a distribution campaign) which are subordinate to the campaign for each of the categorized groups; and a software distribution unit which, for each of the sub-campaigns, distributes software remotely to vehicles targeted by the sub-campaigns based on the sub-campaigns.

Furthermore, in order to solve this problem, the present invention provides an in-vehicle software distribution method of an in-vehicle software distribution system which controls updates to an identical function for in-vehicle systems of a plurality of vehicles. According to the in-vehicle software distribution method, the in-vehicle software distribution system comprises an in-vehicle software distribution server which manages updates to the identical function by means of a campaign and distributes software remotely to vehicles targeted by the campaign based on the campaign, a terminal which performs I/Os to/from the in-vehicle software distribution server, and a software update apparatus which is mounted in each of the plurality of vehicles, downloads the software that has been distributed by the in-vehicle software distribution server, and installs the software in target in-vehicle systems. Furthermore, the in-vehicle software distribution method comprises a campaign creation step in which the in-vehicle software distribution server segments the campaign target vehicles into groups based on a predetermined criterion and creates a plurality of sub-campaigns which are subordinate to the campaign for each of the categorized groups, and a software distribution step in which the in-vehicle software distribution server distributes software remotely to vehicles targeted by the sub-campaigns based on the sub-campaigns, for each of the sub-campaigns.

Advantageous Effects of the Invention

According to the present invention, control for the flexible distribution of update software can be realized.

BRIEF DESCRIPTION OF DRAWINGS

FIG. 3 is a diagram showing a specific example of vehicle configuration information.

FIG. 4 is a diagram showing a specific example of main campaign information.

FIG. 5 is a diagram showing a specific example of test campaign information.

FIG. 6 is a diagram showing a specific example of distribution campaign information.

FIG. 7 is a diagram showing a specific example of update progress status information.

FIG. 9 is a diagram explaining an example of a campaign management screen.

FIG. 10 is (part 1 of) a sequence diagram showing an example of the process steps of update software verification processing based on a test campaign.

FIG. 16 is a diagram explaining an example of a distribution campaign creation screen.

DESCRIPTION OF EMBODIMENTS

An embodiment of the present invention will now be explained in detail with reference to the appended drawings.

(1) First Embodiment (1-1) Configuration of an in-Vehicle Software Distribution System 1

Figure 1:
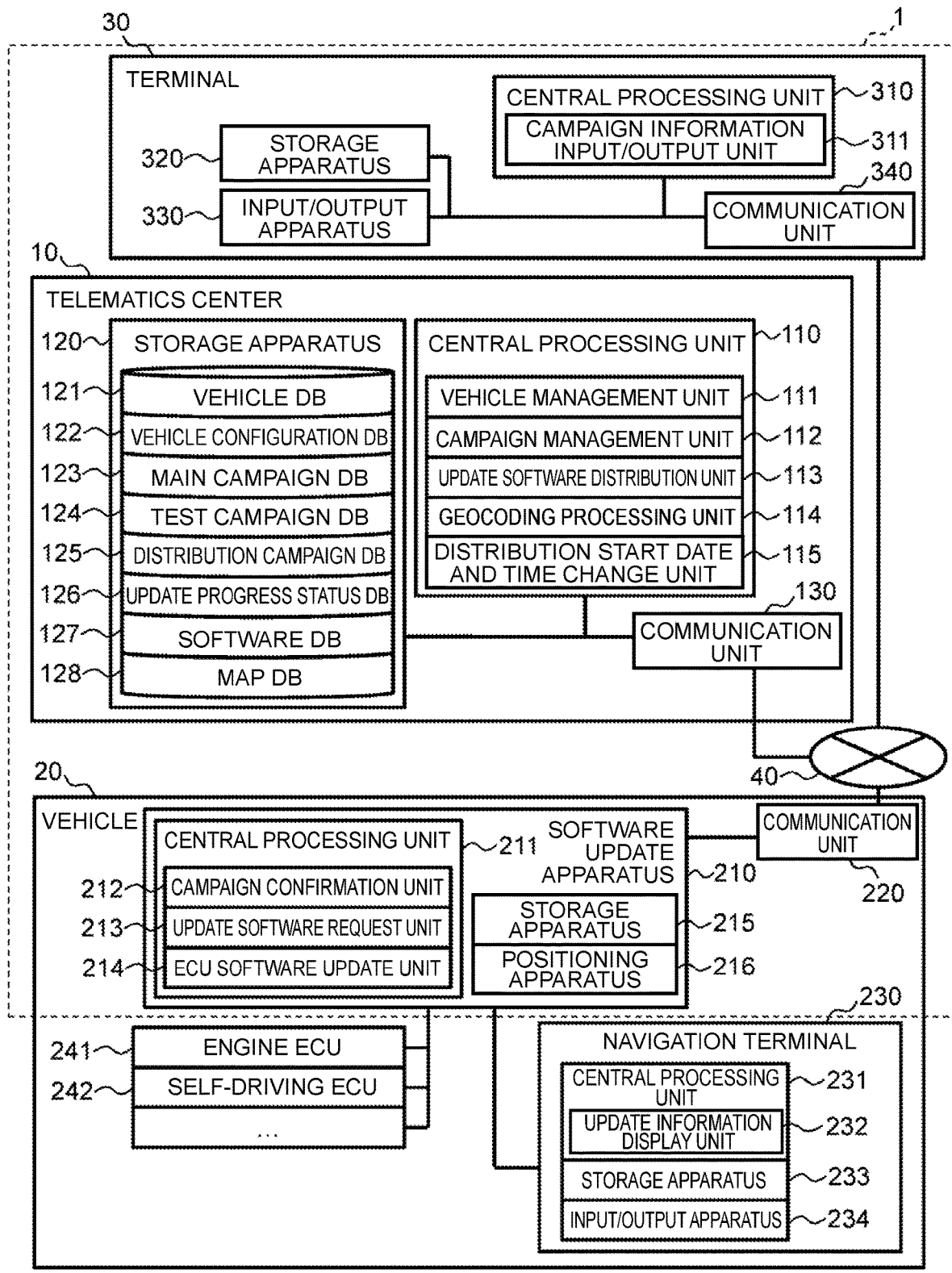
FIG. 1 is a diagram showing a configuration example of an in-vehicle software distribution system according to a first embodiment of the present invention.

FIG. 1 is a diagram showing a configuration example of an in-vehicle software distribution system according to a first embodiment of the present invention. The in-vehicle software distribution system 1 shown in FIG. 1 is a system which distributes software to a vehicle 20 while confirming information on the position of the vehicle 20 and which comprises a telematics center 10 which is a server, a software update apparatus 210 which is mounted in the vehicle 20, and a terminal 30 which performs I/Os to/from the telematics center 10. Note that, as shown in FIG. 1, the telematics center 10, software update apparatus 210 and terminal 30 are communicably interconnected via a network 40.

As shown in FIG. 1, the telematics center 10 is connected to the network 40 via a communication unit 130, the software update apparatus 210 is connected to the network 40 via a communication unit 220 of the vehicle 20, and the terminal 30 is connected to the network 40 via a communication unit 340. As a result, the telematics center 10, software update apparatus 210 and terminal 30 are communicably interconnected via the network 40. The network 40 can be configured from a cellular phone network, an internet network, or near field communication such as wireless LAN (Local Area Network), or from a combination thereof, for example.

Note that although only one vehicle 20 in which the software update apparatus 210 is mounted is displayed in FIG. 1, the configuration according to this embodiment is not limited to or by this configuration and may instead be a configuration in which a plurality of vehicles 20 in each of which the software update apparatus 210 is mounted are communicably connected to the telematics center 10 and terminal 30 via the network 40. Furthermore, the telematics center 10 and terminal 30 may also be realized by the same device.

(1-1-1) Telematics Center 10

The telematics center 10 is a server which receives a software distribution instruction from the terminal 30 via the network 40 and distributes the software to the vehicle 20. The telematics center 10 comprises a central processing unit 110, a storage apparatus 120, and a communication unit 130.

The central processing unit 110 is configured from a CPU (Central Processing Unit) and RAM (Random Access Memory) and the like, for example, and implements the respective functions of the telematics center 10 by executing a predetermined program. The central processing unit 110 comprises, as configurations for each of these functions, a vehicle management unit 111, a campaign management unit 112, an update software distribution unit 113, a geocoding processing unit 114, and a distribution start date and time change unit 115. Note that the distribution start date and time change unit 115 is a configuration for realizing the functions of the in-vehicle software distribution system according to a second embodiment of the present invention.

The vehicle management unit 111 manages each information item stored in a vehicle DB 121 and vehicle configuration DB 122 of the storage apparatus 120 and registers, changes and deletes each information item as required.

The campaign management unit 112 manages each information item stored in a main campaign DB 123, test campaign DB 124, and distribution campaign DB 125 of the storage apparatus 120, and registers, changes and deletes each information item according to software distribution instructions from the terminal 30 and software installation result notifications from the vehicle 20 (software update apparatus 210), and the like.

The update software distribution unit 113 extracts update software which is suitable for the vehicle 20 from a software DB 127 of the storage apparatus 120 according to an instruction from the terminal 30 and sends the update software to the vehicle 20 via the communication unit 130 and network 40.

The geocoding processing unit 114 receives position information (latitude information and longitude information) of the vehicle 20 acquired by the positioning apparatus 216 (described in detail subsequently) of the vehicle 20 and, by using a map DB 128 of the storage apparatus 120 to specify an address from the position information, recognizes in which country and area (region) the vehicle 20 is located.

The distribution start date and time change unit 115 is a configuration for the functions realized by the second embodiment (described subsequently) and changes each information item which is stored in the distribution campaign DB 125 of the storage apparatus 120 based on the software distribution completion status.

The storage apparatus 120 is configured from an HDD (Hard Disk Drive), SSD (Solid State Drive), flash memory, or a ROM (Read Only Memory) or the like, for example. In addition to the program executed by the central processing unit 110, the storage apparatus 120 stores data groups or the like which are required to execute the program.

As shown in FIG. 1, as the data groups stored in the storage apparatus 120, the storage apparatus 120 comprises the vehicle DB 121, vehicle configuration DB 122, main campaign DB 123, test campaign DB 124, distribution campaign DB 125, update progress status DB 126, software DB 127, and map DB 128 and the like.

Note that 'campaign' in the main description refers to the units of the information for managing the update software which is to be distributed to update certain ECU identical functions in association with information on one or more vehicles 20 which are the distribution destinations. More precisely, when update software is newly distributed to update the software, the overall distribution of update software is referred to as the 'main campaign.' Furthermore, as units which are subordinate to the 'main campaign,' an update software distribution test for a specific vehicle 20 which is limited to a test (verification) application is referred to as a 'test campaign.' Furthermore, as units which are subordinate to the 'main campaign' and 'test campaign,' update software distribution to vehicles 20 that exist worldwide which is performed upon obtaining a successful result in an update software distribution test by means of the 'test campaign' is referred to as a 'distribution campaign.' As a specific example of a campaign, recall compatibility may be cited, for example, and, as a result of the campaign, a function update is performed as a result of update software for eliminating the cause of the recall being distributed and the update software being installed on a target ECU.

Figure 2:
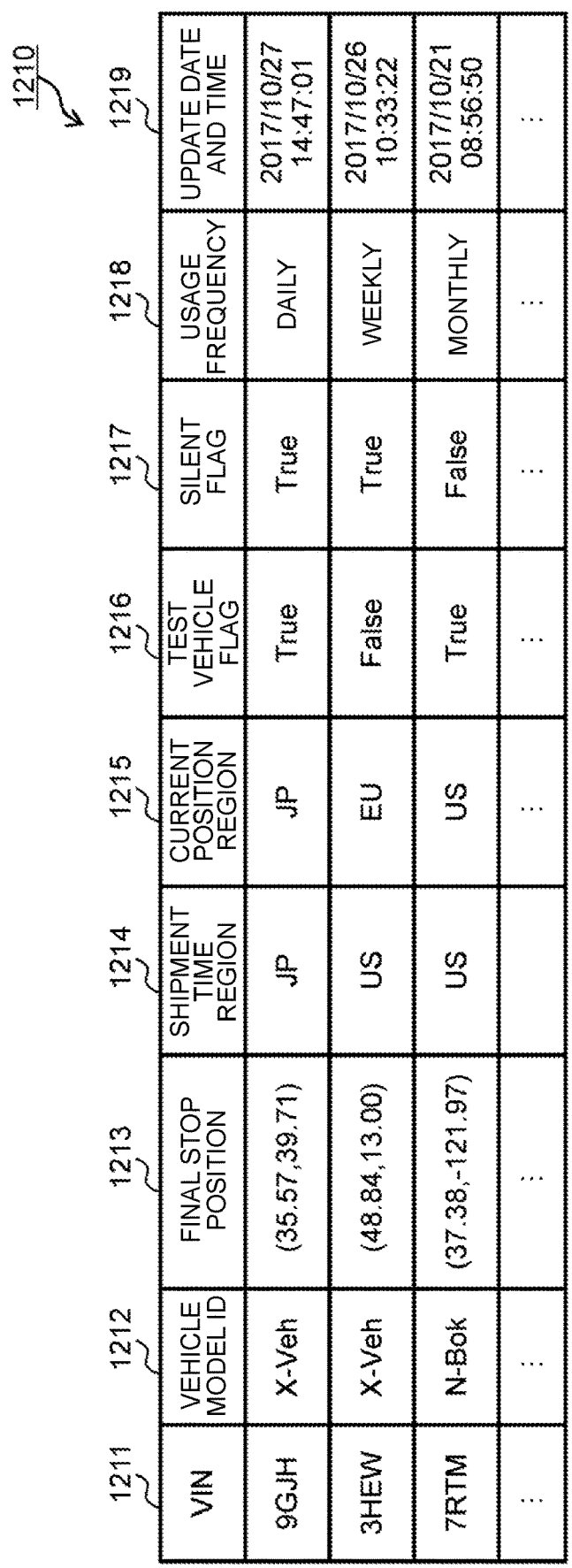
FIG. 2 is a diagram showing a specific example of vehicle information.

The vehicle DB 121 stores, for each of one or more vehicles 20 (each vehicle 20), 'vehicle information' which is configured from the vehicle model, usage status and information that can serve as a limiting condition when software is distributed, and the like. A specific example of 'vehicle information' is shown in FIG. 2, described subsequently.

The vehicle configuration DB 122 stores, for each of the vehicles 20, 'vehicle configuration information' which is configured from the type of ECU mounted and information for managing the version of the software installed, and the like. A specific example of 'vehicle configuration information' is shown in FIG. 3, described subsequently.

The main campaign DB 123 stores 'main campaign information' which is configured from the type of ECU which is the software update target in the main campaign, the limiting conditions at the time of distributing the update software, and information for managing the number of vehicles which are update targets, and the like. A specific example of 'main campaign information' is shown in FIG. 4, described subsequently.

As mentioned earlier, the test campaign DB 124 stores, prior to the distribution campaign, 'test campaign information' which is configured from information required for a 'test campaign' that is carried out for a specific vehicle 20 which is limited to a test application. 'Test campaign information' is information that is subordinate to the 'main campaign information' and a specific example is shown in FIG. 5, described subsequently.

As mentioned earlier, the distribution campaign DB 125 stores 'distribution campaign information' which is configured from information required for a 'distribution campaign' that is carried out for vehicles 20 which exist worldwide upon obtaining a successful test campaign result. 'Distribution campaign information' is information that is subordinate to the 'main campaign information' and 'test campaign information' and a specific example is shown in FIG. 6, described subsequently.

The update progress status DB 126 stores 'update progress status information' which is information for managing the installation progress status of the update software in each vehicle 20. A specific example of 'update progress status information' is shown in FIG. 7, described subsequently.

The software DB 127 stores the update software which is distributed to the vehicle 20. Furthermore, the map DB 128 stores 'map data' for the country and area where the vehicle 20 is traveling. Map data, specifically information such as intersections, streets and borders, for example, is expressed by means of points and lines and the like.

The communication unit 130 is configured from a network card or the like which conforms to the communication standard used by the network 40, and sends and receives data based on various protocols to and from the vehicles 20 and terminal 30 via the network 40. The network card conforms to communication standards required for either wired communication such as wired LAN or wireless communication such as wireless LAN or both thereof.

(1-1-2) Vehicle 20

The vehicle 20 comprises the software update apparatus 210, communication unit 220, navigation terminal 230, and various ECUs (engine ECU 241, self-driving ECU 242, . . . ). The devices of the vehicle 20 are each connected by an in-vehicle network such as a CAN (Controller Area Network).

The software update apparatus 210 comprises a central processing unit 211, a storage apparatus 215, and a positioning apparatus 216.

The central processing unit 211 is configured from a CPU and a RAM and the like, for example, and implements the respective functions of the software update apparatus 210 by executing a predetermined program. The central processing unit 211 comprises, as configurations for each of these functions, a campaign confirmation unit 212, an update software request unit 213, and an ECU software update unit 214.

With the engine start of the vehicle 20 serving as the trigger, the campaign confirmation unit 212 issues an inquiry to the telematics center 10 and confirms whether there is campaign information for implementing a software update in the ECU of this same vehicle.

As a result of the confirmation by the campaign confirmation unit 212, if a campaign targeting the self-driving car ECU is present, the update software request unit 213 requests and downloads the update software for this campaign from the telematics center 10.

The ECU software update unit 214 uses the update software downloaded by the update software request unit 213 to update the update target ECU.

The storage apparatus 215 is configured from an HDD, SSD, flash memory, or a ROM or the like, for example. In addition to the program executed by the central processing unit 211, the storage apparatus 215 stores data groups or the like which are required to execute the program.

The positioning apparatus 216 is configured from a GPS (Global Positioning System) center or the like, for example, and acquires position information (latitude information and longitude information) specifying the current position of the vehicle 20.

The communication unit 220 is configured from a network card or the like which conforms to the communication standard used by the network 40, and sends and receives data based on various protocols to and from the telematics center 10 and terminal 30 via the network 40. The network card conforms to wireless communication such as wireless LAN, for example.

The navigation terminal 230 is configured from a standard navigation apparatus which comprises a navigation function that delivers guidance on the current position of the vehicle 20 during travel and the route to a destination. The navigation terminal 230 comprises a central processing unit 231, a storage apparatus 233, and an input/output apparatus 234.

The central processing unit 231 is configured from a CPU and a RAM and the like, for example, and implements the navigation function of the navigation terminal 230 by executing a predetermined operation program. The central processing unit 231 comprises an update information display unit 232 as a configuration of this function. The update information display unit 232 displays, on the input/output apparatus 234, a display screen based on the navigation function and a display screen based on update software information that is sent from the telematics center 10.

The storage apparatus 233 is configured from an HDD, SSD, flash memory, or a ROM or the like, for example. In addition to the program executed by the central processing unit 231, the storage apparatus 233 stores data groups or the like which are required to execute the program.

The input/output apparatus 234 is configured by combining a touch panel, a keyboard or a mouse or the like and functions as an input unit and output unit (display unit) for the navigation terminal 230 and software update apparatus 210.

Note that the software update apparatus 210 and navigation terminal 230 may be realized by the same device in the vehicle 20 according to this embodiment. Furthermore, the present invention is not limited to or by a configuration in which the navigation terminal 230 is mounted in the vehicle 20, rather, the configuration may be such that a mobile terminal such as a smart phone which exhibits the same functions as the navigation terminal 230 is used instead of the navigation terminal 230, for example. In this case, as a result of placing the communication unit 220 communicably close to the mobile terminal and of the software update apparatus 210 using an OBD (On Board Diagnostics) connector or other connector, for example, the software update apparatus 210 may be considered to be communicating with the mobile terminal.

The engine ECU 241 is an ECU which manages the engine operation in the vehicle 20. The self-driving ECU 242 is an ECU which manages control of the self-driving operation of the vehicle 20. As shown in FIG. 1, these ECU are connected to bus-type CAN networks and the software update apparatus 210 comprises a hub function for these bus-type networks.

Note that although the engine ECU 241 and self-driving ECU 242 are shown in FIG. 1 as an example of various ECUs, the various ECUs installed in the vehicle 20 are not limited to or by such ECUs. For example, an ECU which comprises a function for supporting the control and safety of the vehicle 20 such as a suspension control ECU or an electronic mirror control ECU may be installed. Note that the ECUs each contain software for their own operation. This software is stored in each of the storage apparatuses (not shown) that each ECU comprises and is executed by the central processing unit (not shown) that each ECU comprises. Although a situation has been assumed in the foregoing explanation where a self-driving ECU 242 is updated by distributing update software as an example, the ECU targeted by the update in this embodiment is not limited to or by such a situation.

(1-1-3) Terminal 30

The terminal 30 is a mobile terminal or the like such as a generic computer, tablet or smartphone and comprises a central processing unit 310, a storage apparatus 320, an input/output apparatus 330, and a communication unit 340.

The central processing unit 310 is configured from a CPU and a RAM and the like, for example, and implements the functions of the terminal 30 by executing a predetermined operation program. The central processing unit 310 comprises a campaign information input/output unit 311 as a configuration of this function.

The campaign information input/output unit 311 asks the telematics center 10 about campaign information according to user operation of the input/output apparatus 330 and displays the campaign information thus received on the input/output apparatus 330.

The storage apparatus 320 is configured from an HDD, SSD, flash memory, or a ROM or the like, for example. In addition to the program executed by the central processing unit 211, the storage apparatus 320 stores data groups or the like which are required to execute the program.

The input/output apparatus 330 is configured by combining a touch panel, a keyboard or a mouse or the like and functions as an input unit and output unit (display unit) for the terminal 30 and telematics center 10.

The communication unit 340 is configured from a network card or the like which conforms to the communication standard used by the network 40, and sends and receives data based on various protocols to and from the telematics center 10 via the network 40. The network card conforms to wireless communication such as wireless LAN, for example.

Note that, as mentioned hereinabove, the terminal 30 may be realized by the same device as the telematics center 10, and when the telematics center 10 is configured by comprising the functions of the terminal 30, for example, the telematics center 10 may comprise an input/output apparatus which corresponds to the input/output apparatus 330 of the terminal 30 and the central processing unit 110 may comprise the campaign information input/output unit 311.

(1-2) Structure of Various Data

The structure of various data which is stored in the DB in the storage apparatus 120 of the telematics center 10 shown in FIG. 1 will be explained hereinbelow with reference to a specific example. Note that although a data structure in a table format is shown in this specific example, the structure of the various data according to this embodiment is not limited to or by this table format.

FIG. 2 is a diagram showing a specific example of vehicle information. This vehicle information is meta information on the vehicle body for each vehicle 20 and is stored in the vehicle DB 121. The vehicle information 1210 shown in FIG. 2 is data in a table format which is configured by comprising a VIN 1211, a vehicle model ID 1212, a final stop position 1213, a shipment time region 1214, a current position region 1215, a test vehicle flag 1216, a silent flag 1217, a usage frequency 1218, and an update date and time 1219.

The VIN 1211 is an identifier which makes it possible to uniquely specify the vehicle 20 (VIN: Vehicle Identification Number). The vehicle model ID 1212 is an identifier which makes it possible to uniquely specify the model of the vehicle 20 specified by the VIN 1211 (the target vehicle 20 in the record). The final stop position 1213 is position information when the target vehicle 20 finally has its engine OFF and is recorded by latitude and longitude in that order.

The shipment time region 1214 is information indicating the region at the time the target vehicle 20 is shipped and is pre-assigned based on the VIN 1211 and vehicle type ID 1212 or the like. Furthermore, the current position region 1215 is information indicating the current region of the target vehicle 20 (region during distribution) and is inferred from the final stop position 1213 by the geocoding processing unit 114. For example, when the target vehicle 20 is shipped in the U.S.A (US), the shipment time region 1214 is 'US,' but when the vehicle 20 is then exported to and reaches Europe (EU), the current position region 1215 is 'EU.'

The test vehicle flag 1216 is information for managing whether the target vehicle 20 can be a test campaign target. When the target vehicle 20 can be a test campaign target, 'True' is recorded, and when same cannot be a test campaign target, 'False' is recorded.

The silent flag 1217 is information for determining whether it is possible to display a 'confirmation screen' to announce update execution to (notify) the user when the ECU of the target vehicle 20 is updated. When the silent flag 1217 is 'True,' because this means that the confirmation screen display is unnecessary, no such software update announcement is made. When the silent flag 1217 is 'False,' because this means that the confirmation screen display is necessary, the confirmation screen announcing a software update is displayed on a predetermined display screen (for example, the input/output apparatus 234 of the navigation terminal 230). Where setting the silent flag 1217 is concerned, it is assumed that the settings are pre-registered by the owner of the target vehicle 20 operating the input/output apparatus 234 of the navigation terminal 230 and that the registered information is notified to the telematics center 10, and so forth.

The usage frequency 1218 is information indicating the frequency with which the target vehicle 20 is placed in an engine ON state, that is, the frequency with which the target vehicle 20 is used. Note that the method of recognizing the engine ON state of the target vehicle 20 on the telematics center 10 side is not particularly limited. For example, the fact that the engine startup has been detected may be recognized by way of notification from the vehicle 20 to the telematics center 10 or, for example, the telematics center 10 may be configured to calculate the engine ON of the vehicle 20 based on communication (the communication of step S901 in FIG. 13, described subsequently, for example) from the vehicle 20 to the telematics center 10 which is carried out after detecting engine startup.

Furthermore, the update date and time 1219 is information indicating the date and time when the appropriate record of the vehicle information 1210 has been updated.

FIG. 3 is a diagram showing a specific example of vehicle configuration information. The vehicle configuration information is information relating to the ECU which each vehicle 20 comprises and is stored in the vehicle configuration DB 122. The vehicle configuration information 1220 shown in FIG. 3 is data in a table format which is configured by comprising a VIN 1221, an ECU-ID 1222, a serial ID 1223, a software version 1224, and an update date and time 1225.

The VIN 1221 is data common to the VIN 1211 of the vehicle information 1210 and is an identifier which makes it possible to uniquely specify the target vehicle 20.

The ECU-ID 1222 is an identifier which makes it possible to uniquely specify the type of ECU installed in the target vehicle 20. Furthermore, the serial ID 1223 is an identifier which makes it possible to uniquely specify the ECU installed in the target vehicle 20. For example, as can be seen in comparing the first and third rows of the data rows in FIG. 3, though the ECU type (ECU-ID 1222) is the same, the serial ID 1223 of each ECU is different. In addition, the software version 1224 is an identifier that makes it possible to uniquely specify the software installed on the ECU mounted in the target vehicle 20.

Furthermore, the update date and time 1225 is information indicating the date and time when the appropriate record of the vehicle configuration information 1220 was updated.

FIG. 4 is a diagram showing a specific example of main campaign information. As mentioned hereinabove, main campaign information is stored in the main campaign DB 123. The main campaign information 1230 shown in FIG. 4 is data in a table format which is configured by comprising a main campaign ID 1231, an ECU-ID 1232, a critical flag 1233, an update target count 1234, an update completion count 1235, and an update date and time 1236.

The main campaign ID 1231 is an identifier which makes it possible to uniquely specify main campaign information and 'M' is commonly appended to the first character of the ID in this example.

The ECU ID 1232 is data that is common to the ECU ID 1222 of the vehicle configuration information 1220 and is information indicating the ECU type (ECU ID) which is targeted by the software update in the main campaign of the appropriate record.

The critical flag 1233 is information representing the priority level of the main campaign information of the appropriate record and is information for determining whether it is possible to deny the software update by the driver of the vehicle 20. For example, as shown in FIG. 4, when the critical flag 1233 is 'True,' this means that the software update urgency (priority level) of the campaign is high and that the driver of the vehicle 20 has no right to veto the software update. On the other hand, when the critical flag 1233 is 'False,' this means that the software update urgency (priority level) of the campaign is relatively low and that the driver of the vehicle 20 is able to veto the software update (or the update timing).

The update target count 1234 is information that shows the total of the update target counts (which correspond to the update target counts 1256 in the distribution campaign information 1250 shown in FIG. 6) of all distribution campaigns which are subordinate to the main campaign information of the appropriate record. Furthermore, the update completion count 1235 is information that shows the total of the update completion counts (which correspond to the update completion counts 1257 in the distribution campaign information 1250 shown in FIG. 6) of all distribution campaigns which are subordinate to the main campaign information of the appropriate record.

Furthermore, the update date and time 1236 is information indicating the date and time when the appropriate record of the main campaign information 1230 was updated.

FIG. 5 is a diagram showing a specific example of test campaign information. As mentioned hereinabove, test campaign information is stored in the test campaign DB 124. The test campaign information 1240 shown in FIG. 5 is data in a table format which is configured by comprising a test campaign ID 1241, a reference source main campaign ID 1242, a test vehicle VIN 1243, a target region 1244, an update file name 1245, an applied version 1246, a verification hash value 1247, and an update date and time 1248.

The test campaign ID 1241 is an identifier which makes it possible to uniquely specify test campaign information and 'T' is commonly appended to the first character of the ID in this example.

A reference source main campaign ID 1242 is data common to the main campaign ID 1231 of the main campaign information 1230 and is an identifier which makes it possible to uniquely specify the main campaign information which is the reference source (subordinate destination) of the test campaign information of the appropriate record.

The test vehicle VIN 1243 is data that is common to the VIN 1211 of the vehicle information 1210 and the VIN 1221 of the vehicle configuration information 1220 and is information for specifying the vehicle 20 (test vehicle) to which the test campaign of the appropriate record distributes software when the test is executed.

The target region 1244 is information indicating the distribution target region which is assumed for the update software designated by the update file name 1245 (described subsequently). Note that the data recorded in the target region 1244 (similarly also the target region 1254, described subsequently) is preferably data that is common to the current position region 1215 of the vehicle information 1210.

The update file name 1245 is an identifier which makes it possible to uniquely specify the update software that is distributed in the test executed by the test campaign of the appropriate record.

The applied version 1246 is data that is common to the software version 1224 of the vehicle configuration information 1220 and is version information after installing the update software specified by the update file name 1245.

The verification hash value 1247 is information indicating the hash value acquired for the whole area of the storage apparatus after the vehicle 20 designated in the test campaign of the appropriate record (that is, the test vehicle specified by the test vehicle VIN 1243) has undergone an update target ECU software update.

Furthermore, the update date and time 1248 is information indicating the date and time when the appropriate record of the test campaign information 1240 was updated.

FIG. 6 is a diagram showing a specific example of distribution campaign information. As mentioned hereinabove, distribution campaign information is stored in the distribution campaign DB 125. The distribution campaign information 1250 shown in FIG. 6 is data in a table format which is configured by comprising a distribution campaign ID 1251, a reference source main campaign ID 1252, a reference source test campaign ID 1253, a target region 1254, a distribution start date and time 1255, an update target count 1256, an update completion count 1257, and an update date and time 1258.

The distribution campaign ID 1251 is an identifier which makes it possible to uniquely specify distribution campaign information and 'D' is commonly appended to the first character of the ID in this example.

A reference source main campaign ID 1252 is data common to the main campaign ID 1231 of the main campaign information 1230 and is an identifier which makes it possible to uniquely specify the main campaign information which is the reference source (subordinate destination) of the distribution campaign information of the record. Furthermore, the reference source test campaign ID 1253 is data common to the test campaign ID 1241 of the test campaign information 1240 and is an identifier which makes it possible to uniquely specify the test campaign information which is the reference source (subordinate destination) of the distribution campaign information of the record.

The target region 1254 is data that is common to the target region 1244 of the test campaign information 1240, and when distribution campaign information of the appropriate record is created, the target region 1244 of the reference source test campaign information 1240 is copied and stored.

The distribution start date and time 1255 is information indicating the date and time when the distribution of the update software to the vehicle 20 is permitted and when the distribution campaign information of the appropriate record is valid.

The update target count 1256 is information indicating the quantity of vehicles 20 for which an update targeting the distribution campaign information of the appropriate record is scheduled. Furthermore, the update completion count 1257 is information indicating the quantity of vehicles 20, whose distribution campaign information of the appropriate record is targeted, for which a software update has been completed. More specifically, that is, the update completion count 1257 is the quantity of vehicles for which a status 1263 in the record matching the distribution campaign ID 1261 of update progress status information 1260, described subsequently, is 'update complete' (see FIG. 7).

Furthermore, the update date and time 1258 is information indicating the date and time when the appropriate record of the distribution campaign information 1250 was updated.

Note that the main campaign information 1230, test campaign information 1240, and distribution campaign information 1250 illustrated in FIGS. 4 to 6 are each input via the input/output apparatus 330 of the terminal 30 by the administrator or the like of the in-vehicle software distribution system 1. The 'administrator or the like of the in-vehicle software distribution system 1' is specifically assumed to be the operator of the in-vehicle software distribution system 1, the manufacturing manager of the vehicle 20, or the manufacturing manager of each ECU, or the like, for example.

FIG. 7 is a diagram showing a specific example of the update progress status information. The update progress status information is information for managing the installation progress status in each vehicle 20 of the update software that is distributed in distribution campaign units and is stored in the update progress status DB 126. The update progress status information 1260 shown in FIG. 7 is data in a table format which is configured by comprising a distribution campaign ID 1261, a VIN 1262, a status 1263, and an update date and time 1264.

The distribution campaign ID 1261 is data that is common to the distribution campaign ID 1251 of the distribution campaign information 1250 and is an identifier that makes it possible to uniquely specify the distribution campaign information. Furthermore, the VIN 1262 is data that is common to the VIN 1211 and the like of the vehicle information 1210 and is an identifier which makes it possible to uniquely specify the vehicle 20 corresponding to the appropriate record.

The status 1263 is information representing the processing status (progress status), in each vehicle 20 specified by the VIN 1262, of the update software of the distribution campaign ID 1261 that is designated by the appropriate record. For example, in the case of FIG. 7, when the status 1263 is 'update complete,' this means that the installation of the update software in vehicle 20 is complete. Here, the subsequently described update date and time 1264 records the date and time 'update complete' was confirmed (or the date and time the installation was completed). Furthermore, when the status 1263 is 'download complete,' this means that the update software download to the vehicle 20 is complete but installation has not been completed. Furthermore, when the status 1263 is 'user permission not acquired,' this means that permission to install the update software in vehicle 20 has not been obtained from the user (driver, for example).

Furthermore, the update date and time 1264 is information indicating the date and time when the appropriate record of the update progress status information 1260 was updated. For example, the update date and time 1264 indicates the date and time when a record created by combining the distribution campaign ID 1261 (distribution campaign ID 1251) with the VIN 1262 was updated.

(1-3) Campaign Processing

Processing relating to the creation and execution of each of the various campaigns (main campaign, test campaign and distribution campaign) of the in-vehicle software distribution system 1 according to this embodiment will be explained.

(1-3-1) Creation of Main Campaign and Test Campaign.

Figure 8:
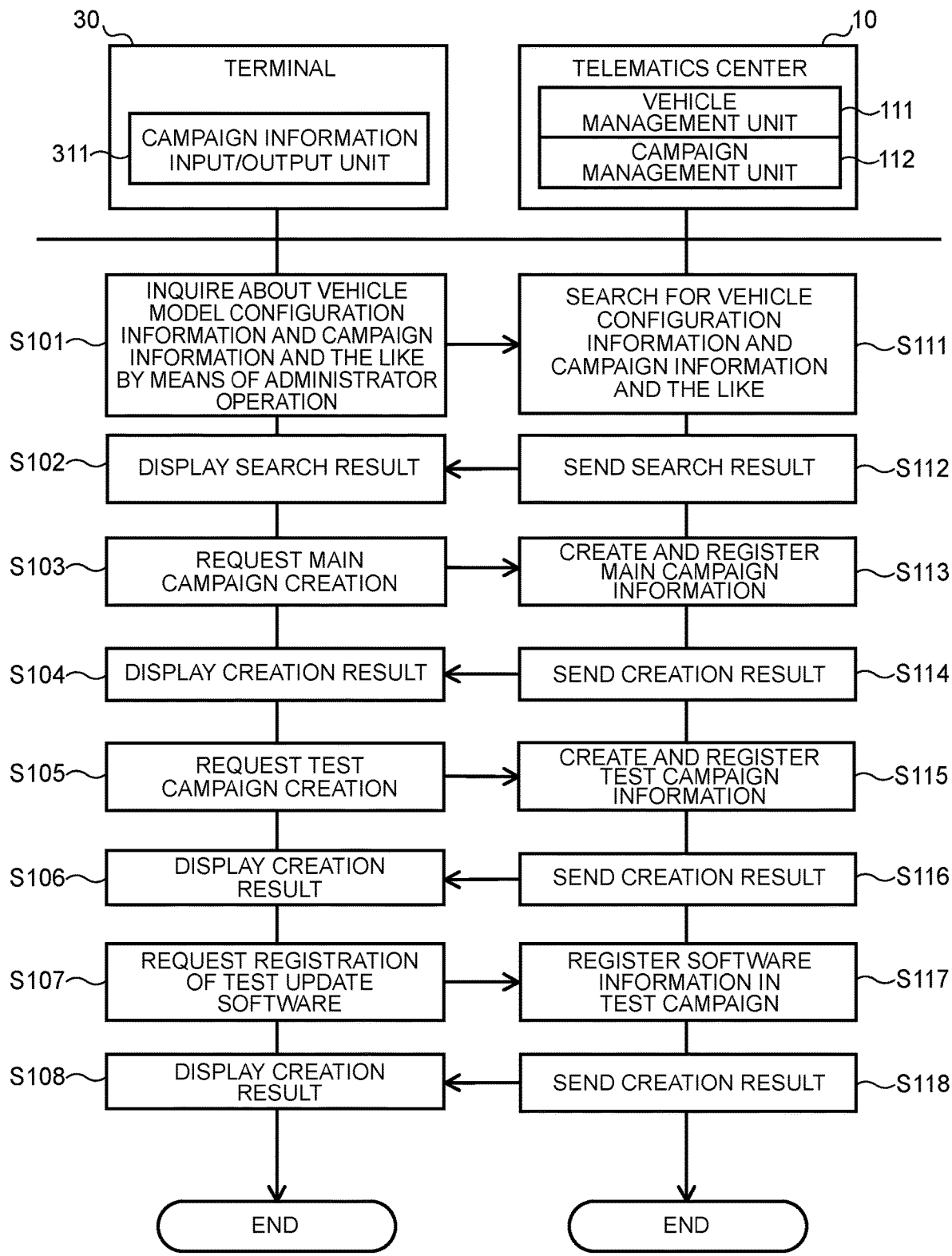
FIG. 8 is a sequence diagram showing an example of the process steps of main campaign information and test campaign information creation processing.

FIG. 8 is a sequence diagram showing an example of the process steps of main campaign information and test campaign information creation processing. The processing shown in FIG. 8 is executed by the campaign information input/output unit 311 of the central processing unit 310 installed in the terminal 30 and by the vehicle management unit 111 and campaign management unit 112 of the central processing unit 110 installed in the telematics center 10.

Foremost, in step S101, the campaign information input/output unit 311 issues an inquiry to the telematics center 10 about all the vehicle information 1210, vehicle configuration information 1220, and campaign information (main campaign information 1230, test campaign information 1240 and distribution campaign information 1250) according to the operation of the input/output apparatus 330 by the administrator.

In the telematics center 10 which has received the inquiry of step S101, the vehicle management unit 111 and campaign management unit 112 search for and extract each of the information items targeted by the inquiry from the vehicle DB 121, vehicle configuration DB 122, main campaign DB 123, test campaign DB 124 and distribution campaign DB 125 (step S111). Further, in step S112, the vehicle management unit 111 and campaign management unit 112 send the search results extracted in S111 to the terminal 30.

Upon receiving the search results sent in step S112, the campaign information input/output unit 311 displays the search results on the input/output apparatus 330 (step S102). The display in step S102 is displayed as a 'campaign management screen' and the administrator is able to create (register) the various campaign information and modify registered campaign information via the campaign management screen.

Here, FIG. 9 is a diagram explaining an example of a campaign management screen. As shown in FIG. 9, a campaign management screen 3310 is displayed on the input/output apparatus 330. On the campaign management screen 3310 illustrated in FIG. 9, details of the various campaign information at the current point in time are visualized in a tree format. More specifically, the details of one main campaign information item under the main campaign ID 'M012' are shown and, as test campaign information which is subordinate to the main campaign information, details of two test campaign information items to which the test campaign IDs 'T45M012' or 'T13M012' have been assigned and details of two distribution campaign information items to which the distribution campaign IDs 'D98M012' or 'D33M012' have been assigned are shown. Note that the subordinate relationship between the test campaign information and distribution campaign information can be identified by referencing the 'reference source test campaign ID' in the detailed display of distribution campaign information.

Moreover, buttons 3311 to 3314 which can be selected by the administrator are disposed on the campaign management screen 3310 illustrated in FIG. 9.

Button 3311 is selected when creating a new main campaign. More specifically, as a result of the administrator performing an operation to select button 3311 when creating a new main campaign, an input screen for predetermined information that is required to create a main campaign is displayed. When the input of the foregoing predetermined information by the administrator is complete, a request to create main campaign information is sent from the terminal 30 to the telematics center 10, based on the input information (step S103 in FIG. 8, described subsequently).

Furthermore, button 3312 is selected when creating a new test campaign by taking the main campaign information linked to the location as a subordinate destination. More specifically, as a result of the administrator performing an operation to select button 3312 when creating a new test campaign which is subordinate to the main campaign of main campaign ID 'M012,' an input screen for predetermined information that is required to create a test campaign is displayed. When the input of the foregoing predetermined information by the administrator is complete, a request to create test campaign information is sent from the terminal 30 to the telematics center 10, based on the input information (step S105 in FIG. 8, described subsequently).

Furthermore, buttons 3313 and 3314 are selected when creating a new distribution campaign by taking a test campaign linked to the location as a subordinate destination. More specifically, as a result of the administrator performing an operation to select button 3313 when creating a new distribution campaign which is subordinate to the test campaign of test campaign ID 'T45M012,' an input screen for predetermined information that is required to create a distribution campaign is displayed. Furthermore, when the input of the foregoing predetermined information by the administrator is complete, a request to create distribution campaign information is sent from the terminal 30 to the telematics center 10, based on the input information (step S403 in FIG. 12, described subsequently).

Note that, although not illustrated in FIG. 9, buttons for modifying the registered content of each campaign information item are provided separately on the campaign management screen 3310.

The explanation of the processing to create main campaign information and test campaign information will now be resumed. When the operation by the administrator to select button 3311 on the campaign management screen 3310 is performed after this screen is displayed in step S102 in FIG. 8, an input screen for predetermined information that is required to create the main campaign is displayed. When the input of the foregoing predetermined information by the administrator is complete, the campaign information input/output unit 311 sends a request to create main campaign information to the telematics center 10, based on the input information (step S103).

Here, the ECU-ID 1232 and critical flag 1233 in the main campaign information 1230 shown in FIG. 4 are included in the predetermined information required to create a new main campaign. For the ECU ID 1232, the ECU ID 1222 of the ECU which is the update target in the main campaign may be selected from the vehicle configuration information 1220. Furthermore, the critical flag 1233 may be selected according to the priority level of the main campaign.

Note that, according to this embodiment, the operating procedure when starting to create new campaign information via the campaign management screen is not limited to displaying a separate input screen according to the selection of predetermined buttons as described hereinabove. As another operating procedure, when starting to create new campaign information, for example, by selecting a predetermined button (button 3311, for example) after inputting predetermined required information (for example, an ECU ID and critical flag in the case of a main campaign), the campaign information input/output unit 311 may issue a request to create campaign information to the telematics center 10. Note that this kind of operating procedure can be applied not only to a main campaign (step S103), rather, same can be similarly to the creation of a new test campaign (step S105 in FIG. 8, described subsequently) or distribution campaign (step S403 in FIG. 12, described subsequently).

The campaign management unit 112 which has received the request to create main campaign information in step S103 creates and registers a record of new main campaign information 1230 in the main campaign DB 123 based on the input information of step S103 (step S113). The campaign management unit 112 then sends the creation result of the newly created main campaign information 1230 to the terminal 30 (step S114).

The campaign information input/output unit 311 which has received the creation result of the main campaign information 1230 then displays the creation result on the input/output apparatus 330 (step S104). Here, the display may be combined with the input information of step S103.

The administrator is then able to create a new test campaign which is subordinate to the main campaign registered in the processing up to step S104 via the campaign management screen. More specifically, for example, when the operation by the administrator to select button 3312 on the campaign management screen is performed, an input screen for predetermined information that is required to create the test campaign is displayed. When the input of the foregoing predetermined information by the administrator is complete, the campaign information input/output unit 311 sends a request to create test campaign information to the telematics center 10, based on the input information (step S105).

Here, the reference source main campaign ID 1242 and test vehicle VIN 1243 in the test campaign information 1240 shown in FIG. 5 are included in the predetermined information required to create a new test campaign. The main campaign ID 1231 received from the telematics center 10 in step S104 can be used for the reference source main campaign ID 1242. Furthermore, the test vehicle VIN 1243 can be selected from the VIN 1211 in the vehicle information 1210 among the search results received in step S102.

Note that limitations are preferably provided that disable selection among all the vehicles 20, i.e. the VIN 1211 which can be selected as the test vehicle VIN 1243 in step S105 are restricted to those for which the test vehicle flag 1216 is 'True' in the record of the vehicle information 1210 linked to the VIN 1211. By limiting the vehicles 20 which can be selected as the test vehicle VIN 1243 in this manner, increased test efficiency and test result reliability in a test campaign can be expected.

Further, the campaign management unit 112 which has received the request to create test campaign information in step S105 creates and registers new test campaign information 1240 in the test campaign DB 124 based on the input information of step S105 (step S115). The campaign management unit 112 then sends the creation result of the newly created test campaign information 1240 to the terminal 30 (step S116).

The campaign information input/output unit 311 which has received the creation result of the test campaign information 1240 then displays the creation result on the input/output apparatus 330 (step S106). Here, the display may be combined with the input information of step S105.

Thereafter, when the operation to register the test update software in the test campaign information 1240 registered in the processing up to step S106 is performed by the administrator, the campaign information input/output unit 311 sends a request to register the update software in the test campaign to the telematics center 10 (step S107).

More specifically, for example, the administrator performs operations (selects predetermined buttons on the campaign management screen, and so forth, for example) to extract the update software which has been prepared beforehand from the storage apparatus 320 of the terminal 30, to input the target version, update file name, and applied version of the foregoing update software (which correspond to the target region 1244, update file name 1245 and applied version 1246 of the test campaign information 1240 shown in FIG. 5 respectively), and to instruct the registration of the update software in the test campaign. The campaign information input/output unit 311 then sends the information thus input to the telematics center 10 based on these operations.

The campaign management unit 112 which has received a request to register the update software in step S107 then registers information (software information) relating to the update software in the target record of the test campaign information 1240 which is stored in the test campaign DB 124 based on the input information of step S107 (step S117). The campaign management unit 112 then sends notification to the effect that the registration of step S117 has succeeded and the update software distribution preparations in the test campaign are complete to the terminal 30 as a creation result (step S118).

The campaign information input/output unit 311 which has received the creation result of the update software finally displays the creation result on the input/output apparatus 330 (step S108).

As a result of executing the processing of each step shown in FIG. 8 hereinabove, the main campaign information 1230 and test campaign information 1240 are created and the test update software distribution preparations in the test campaign are arranged.

(1-3-2) Execution of Test Campaign

Figure 11:
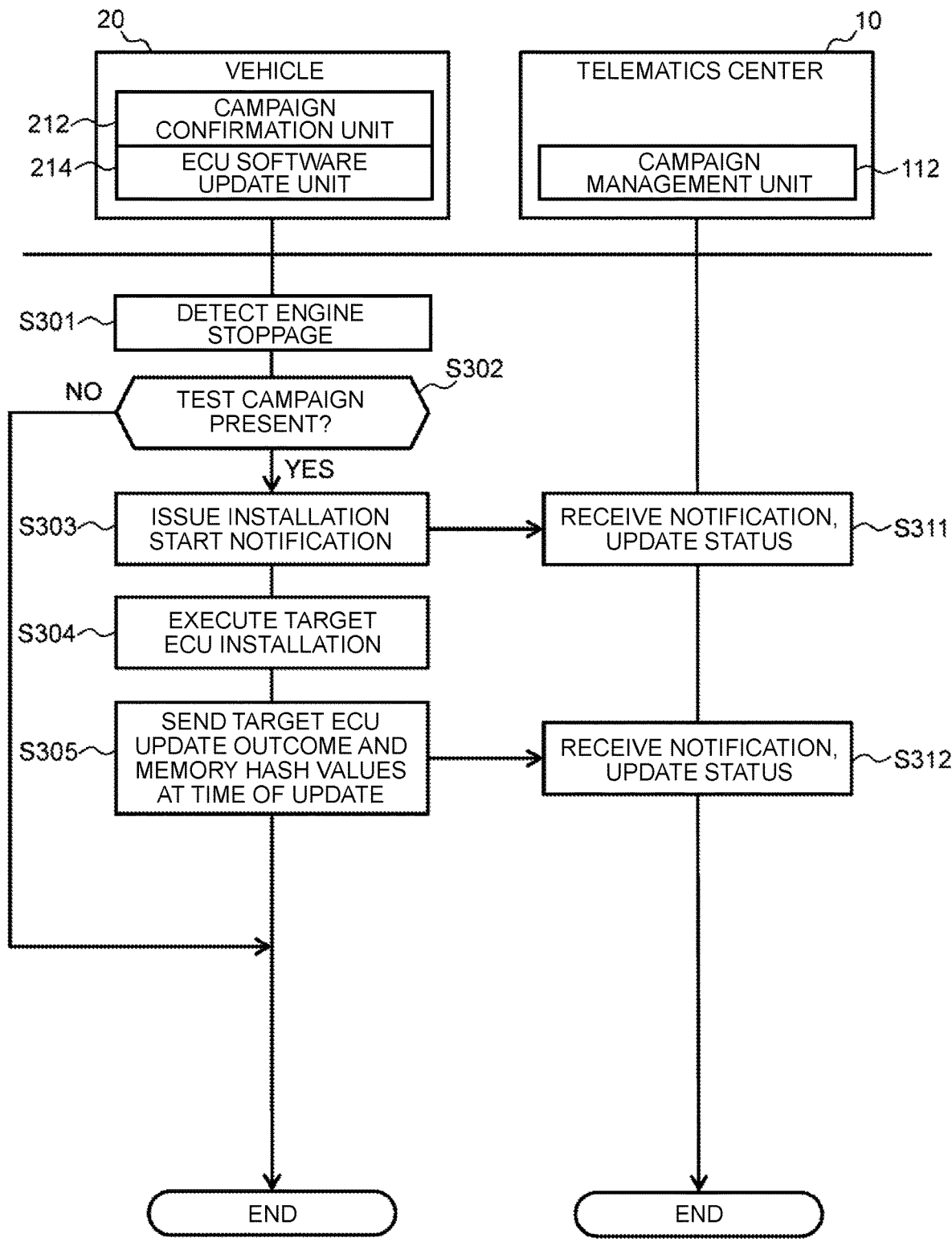
FIG. 11 is (part 2 of) a sequence diagram showing an example of the process steps of update software verification processing based on a test campaign.

FIG. 10 and FIG. 11 are sequence diagrams (parts 1 and 2 thereof) showing an example of the process steps of update software verification processing based on a test campaign. Among these, FIG. 10 shows processing in which vehicle 20 downloads update software from the telematics center 10. Furthermore, FIG. 11 shows processing in which, after the download shown in FIG. 10, vehicle 20 installs the update software on the target ECU and issues notification of this result to the telematics center 10.

The flow of test campaign execution will be explained hereinbelow with reference to FIGS. 10 and 11. Note that in the ensuing explanation which references FIGS. 10 and 11, a case is assumed in which the vehicle 20 is taken to be the vehicle (that is, test vehicle) which corresponds to the test vehicle VIN 1243 designated in step S105 in FIG. 8, and after the processing of FIG. 8 which accompanies the operations by the administrator has been performed, update software verification work is actually undertaken by the test campaign.

First, the update software download processing based on the test campaign will be explained with reference to FIG. 10. The processing shown in FIG. 10 is executed by the campaign confirmation unit 212 and update software request unit 213 of the software update apparatus 210 installed in the vehicle 20 and by the campaign management unit 112 and update software distribution unit 113 of the central processing unit 110 installed in the telematics center 10.

In step S201 of FIG. 10, the campaign confirmation unit 212 of the vehicle 20 detects engine startup (an ON state) by using information obtained from the engine ECU 241. Upon detecting engine startup, the campaign confirmation unit 212 sends an inquiry about the presence of a campaign for the VIN of the vehicle 20 (the VIN 1211 of the vehicle information 1210) to the telematics center 10 (step S202).

In the telematics center 10 which has received the inquiry of step S202, the campaign management unit 112 confirms whether the received VIN has been registered in the test vehicle VIN 1243 of the test campaign information 1240 (step S211). The campaign management unit 112 then sends the confirmation result (search result) of step S211 to the vehicle 20 (step S212). When a corresponding record is present in step S211 as this search result, the campaign management unit 112 sends the test campaign information 1240 of this record, and when there is no corresponding record, sends notification to the effect that test campaign information has not been registered.

In the vehicle 20 which has received a search result from the telematics center 10, the campaign confirmation unit 212 confirms whether test campaign information 1240 is included in the search result (step S204), and when the test campaign information 1240 is not included (NO in step S204), ends the processing because there is no update software to be downloaded. On the other hand, when test campaign information 1240 is included (YES in step S204), the update software request unit 213 issues a request to the telematics center 10 to provide the update software specified by the update file name 1245 of the test campaign information 1240 (step S205).

Further, on the telematics center 10 side, upon receiving the request of step S205 (step S213), the update software distribution unit 113 extracts the update software requested from the software DB 127 based on the designated update file name 1245 and sends the update software to the vehicle 20 (step S214).

The update software which was sent in step S214 is received by the vehicle 20 and the download is started (step S206), and the update software request unit 213 stores the download data of the update software in the storage apparatus 215 (step S207). Further, when the update software download is complete, the update software request unit 213 issues notification to the telematics center 10 that the download is complete (step S208).

Further, in the telematics center 10, upon receiving (acknowledging) the download completion notification of step S208, the campaign management unit 112 temporarily stores information that is common to the status 1263 of the update progress status information 1260 (more specifically, information corresponding to the 'download completion') instead of hash values for the verification hash value 1247 of the target test campaign information 1240 (step S215). As a result of this processing, the progress of the test campaign up until download completion can be managed by means of the test campaign information 1240.

Thereafter, the campaign management unit 112 sends an instruction to start installing the downloaded update software to the vehicle 20 (step S216).

Further, in the telematics center 10, upon receiving (acknowledging) the installation start instruction of step S216, the campaign confirmation unit 212 shifts to a standby state of awaiting the start of the update software installation until the engine assumes a stop state (OFF state) (step S209). The campaign confirmation unit 212 is able to detect engine stoppage by using information that is obtained from the engine ECU 241. When the engine subsequently enters a stop state, the installation processing is started as shown in FIG. 11.

Test campaign-based update software installation processing and result notification processing will be explained next with reference to FIG. 11. The processing shown in FIG. 11 is executed by the campaign confirmation unit 212 and ECU software update unit 214 of the software update apparatus 210 installed in the vehicle 20 and by the campaign management unit 112 of the central processing unit 110 installed in the telematics center 10.

In step S301 of FIG. 11, the campaign confirmation unit 212 of the vehicle 20 detects engine stoppage (an OFF state) by using information obtained from the engine ECU 241. Upon detecting engine stoppage, the campaign confirmation unit 212 confirms whether update software has been stored in the storage apparatus 215, that is, confirms whether test campaign information is present (step S302).

When test campaign information is not present in the confirmation of step S302 (NO in step S302), the campaign confirmation unit 212 ends the processing because there is no update software to be installed. On the other hand, when test campaign information is present (YES in step S302), the campaign confirmation unit 212 issues notification to the telematics center 10 regarding the start of the update target ECU software installation (step S303).

In the telematics center 10 which has received the installation start notification of step S303, the campaign management unit 112 temporarily stores, for the verification hash value 1247 of the target test campaign information 1240, information that is common to the status 1263 of the update progress status information 1260 instead of the hash value (more specifically, information corresponding to 'start of installation') (step S311). As a result of this processing, the progress of the test campaign up until the start of installation can be managed by means of the test campaign information 1240.

Further, on the vehicle 20 side, the ECU software update unit 214 executes the software installation of the update target ECU and overwrites the storage apparatus of the ECU (step S304). At this time, the ECU software update unit 214 receives a hash value which is created by regarding the storage apparatus area of the ECU as one binary data in addition to update outcome information from the update target ECU. Furthermore, the ECU software update unit 214 sends the update outcome information acquired from the update target ECU and, in the event of a successful update, the hash value to the telematics center 10 (step S305).

In the telematics center 10 which has received the update outcome information and hash value which were sent in step S305, the campaign management unit 112 updates the verification hash value 1247 of the target test campaign information 1240 to the hash value (step S312).

Note that when a software update in the vehicle 20 has failed (when update failure information is received), the campaign management unit 112 manages test campaign failure by temporarily storing, for the verification hash value 1247 of the target test campaign information 1240, information that is common to the status 1263 of the update progress status information 1260 (more specifically, information corresponding to 'test campaign failure'). In this case, consideration may be given to the administrator re-registering a revised version of the update software in the test campaign (see step S107 in FIG. 8) and re-executing the processing of FIGS. 10 and 11. When the software update then succeeds as a result of the re-execution, the verification hash value 1247 may be updated by using the hash value that was sent together with the update outcome information from the vehicle 20.

As a result of executing the processing of each step shown in FIGS. 10 and 11 hereinabove, execution of the test campaign is complete. When the test in the test campaign has ended successfully, a situation arises where distribution campaign execution (FIGS. 13 and 14) is possible through the creation (FIG. 12) of a distribution campaign, as will be described subsequently.

(1-3-3) Creation of Distribution Campaign

Figure 12:
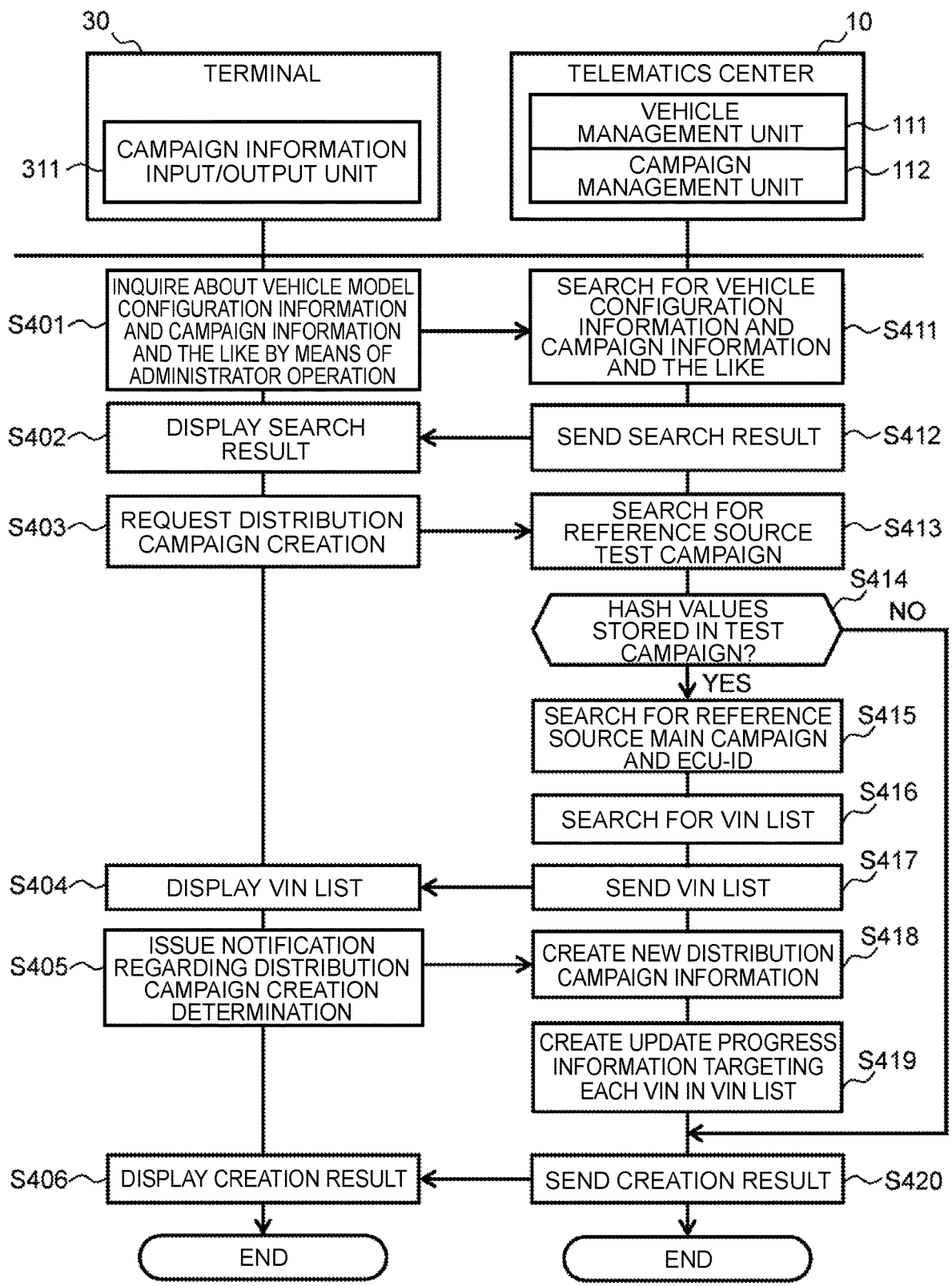
FIG. 12 is a sequence diagram showing an example of the process steps of processing to create distribution campaign information.

FIG. 12 is a sequence diagram showing an example of the process steps of processing to create distribution campaign information. The processing shown in FIG. 12 is executed by the campaign information input/output unit 311 of the central processing unit 310 installed in the terminal 30, and the vehicle management unit 111 and campaign management unit 112 of the central processing unit 110 installed in the telematics center 10.

Foremost, in step S401, the campaign information input/output unit 311 issues an inquiry to the telematics center 10 about all the vehicle information 1210, vehicle configuration information 1220, and campaign information (main campaign information 1230, test campaign information 1240 and distribution campaign information 1250) according to the operation of the input/output apparatus 330 by the administrator.

In the telematics center 10 which has received the inquiry of step S401, the vehicle management unit 111 and campaign management unit 112 search for and extract each of the information items targeted by the inquiry from the vehicle DB 121, vehicle configuration DB 122, main campaign DB 123, test campaign DB 124 and distribution campaign DB 125 (step S411). Further, in step S412, the vehicle management unit 111 and campaign management unit 112 send the search results extracted in S411 to the terminal 30.

Upon receiving the search results sent in step S412, the campaign information input/output unit 311 displays the search results on the input/output apparatus 330 (step S402). The display in step S402 is displayed as per the campaign management screen 3310 illustrated in FIG. 9, for example. As mentioned hereinabove with reference to FIG. 9, the administrator is able to create (register) various campaign information and modify registered campaign information via the campaign management screen 3310.

When the operation by the administrator to select button 3313 (or button 3314) on the campaign management screen 3310 is performed after this screen is displayed in step S402, an input screen for predetermined information that is required to create a distribution campaign is displayed. When the input of the foregoing predetermined information by the administrator is complete, the campaign information input/output unit 311 sends a request to create distribution campaign information to the telematics center 10, based on the input information (step S403).

Here, the predetermined information that is required to create a new distribution campaign includes the reference source main campaign ID 1252, reference source test campaign ID 1253, target region 1254, and distribution start date and time 1255 in the distribution campaign information 1250 shown in FIG. 6. Among the foregoing information items, for the reference source test campaign ID 1253, one test campaign information 1240 of a test campaign to which the distribution campaign is subordinate may be selected from the search results received in step S402, and the test campaign ID 1241 may be selected. Moreover, for the reference source main campaign ID 1252 and target region 1254, the reference source main campaign ID 1242 and target region 1254 of the foregoing selected test campaign information 1240 may be applied. Moreover, the administrator may optionally set the distribution start date and time 1255.

Note that, in the processing to create the distribution campaign information shown in FIG. 12, the distribution campaign information is not created simply by issuing a request to create distribution campaign information in step S403, rather, final confirmation information prior to creating the distribution campaign is extracted by means of the subsequent processing (steps S413 to S417) in the telematics center 10.

The campaign management unit 112 which has received the request to create distribution campaign information in step S403 first searches for reference-source test campaign information 1240 which has been stored in the test campaign DB 124, based on the input information of step S403 (step S413). Moreover, the campaign management unit 112 confirms whether the reference-source test campaign information 1240 is present and whether a hash value has been stored (accumulated) instead of information corresponding to a status (for example, information corresponding to 'download complete' or 'start of installation' and the like) as the verification hash value 1247 of the appropriate record (step S414).

When a hash value has not been stored as the test campaign information 1240 designated in step S414 (NO in step S414), this means that verification of the update software in the test campaign has not been completed, and hence the campaign management unit 112 cancels the creation of the distribution campaign information and sends the result to the terminal 30 as the creation result (step S420).

On the other hand, when a hash value has been stored as the test campaign information 1240 designated in step S414 (YES in step S414), this means that verification of the update software in the test campaign has not been completed normally, and hence the campaign management unit 112 performs the processing of step S415.

In step S415, the campaign management unit 112 searches for reference-source main campaign information 1230 which has been stored in the main campaign DB 123 by using the reference source main campaign ID 1242 obtained from the test campaign information 1240, and extracts the ECU ID 1232 from the main campaign information 1230. The reference-source test campaign information 1240 searched for in S413 and reference-source main campaign information 1230 searched for in step S415 are both campaign information to which the new distribution campaign information that is to be created is subordinate.

Thereafter, in step S416, the campaign management unit 112 searches for the vehicle information 1210 stored in the vehicle DB 121 and the vehicle configuration information 1220 stored in the vehicle configuration DB 122 and extracts all the VIN 1211 (VIN 1221) of the vehicles for which there is a match between the ECU ID 1222 of the vehicle configuration information 1220 and the ECU ID 1232 of the reference-source main campaign information 1230, and between the current position region 1215 of the vehicle information 1210 and the target region 1244 of the reference-source test campaign information 1240.

The VINs 1211 (VINs 1221) of the vehicles extracted in step S416 correspond to the VINs of the vehicles serving as distribution campaign targets and hence the campaign management unit 112 sends a list in which the VINs are summarized (a VIN list) to the terminal 30 (step S417).

The campaign information input/output unit 311 which has received the VIN list then displays the received VIN list on the input/output apparatus 330 (step S404). The final confirmation information prior to distribution campaign creation is shown to the administrator by means of the display of step S404. However, when the administrator confirms the VIN list thus displayed and determines that there is no problem with the target vehicle of the distribution campaign, the administrator performs predetermined operations to issue notification to determine the creation of the distribution campaign. When the aforementioned operations are performed, the campaign information input/output unit 311 sends notification to determine the creation of the distribution campaign to the telematics center 10 (step S405).

In the telematics center 10 which has received the notification to determine the creation of the distribution campaign of step S405, the campaign management unit 112 creates a record of new distribution campaign information 1250 in the distribution campaign DB 125 based on the information received in step S413 (step S418).

In addition, by creating individual records of update progress status information 1260 by means of the respective VIN in the update progress status DB 126 based on the VIN list extracted in step S416, the campaign management unit 112 is able to separately manage each vehicle 20 which is the subject of the progress status during the execution of the distribution campaign (step S419). Furthermore, at this time, the total number of target vehicles 20 is recorded in the update target count 1234 of the main campaign information 1230 and '0' is recorded in the update completion count 1235.

After the processing of step S419 is complete, the campaign management unit 112 sends the creation result relating to the newly created distribution campaign information 1250 and updated main campaign information 1230 to the terminal 30 (step S420).

In the telematics center 10 which has received the creation result thus sent in step S420, the campaign information input/output unit 311 displays the creation result on the input/output apparatus 330 (step S406).

As a result of performing the foregoing processing of each step shown in FIG. 12, the distribution campaign information 1250 which is subordinate to the main campaign information 1230 and test campaign information 1240 is created and preparations to distribute the update software in the distribution campaign are made.

(1-3-4) Execution of Distribution Campaign

Figure 13:
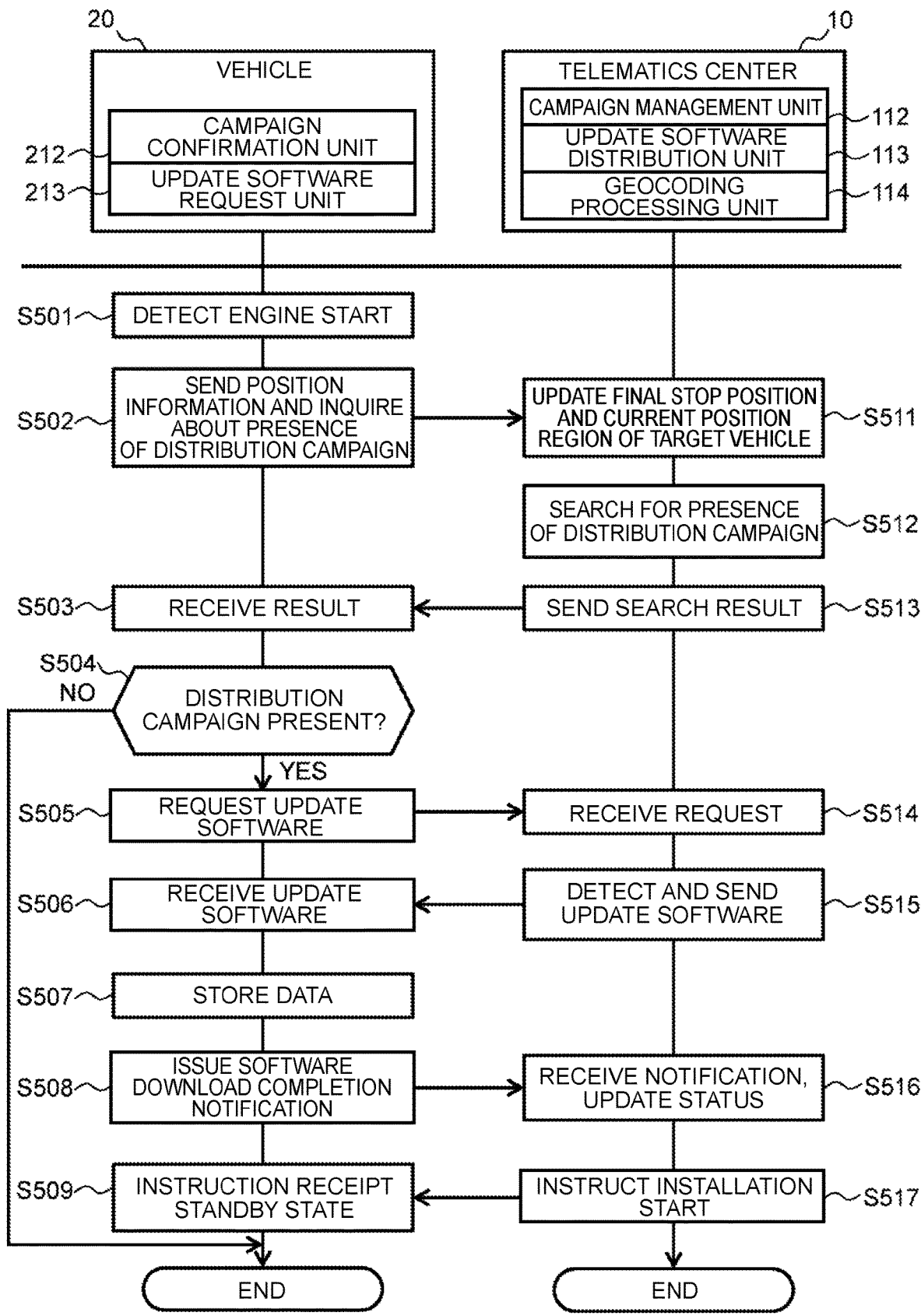
FIG. 13 is (part 1 of) a sequence diagram showing an example of the process steps of update software distribution processing based on a distribution campaign.
Figure 14:
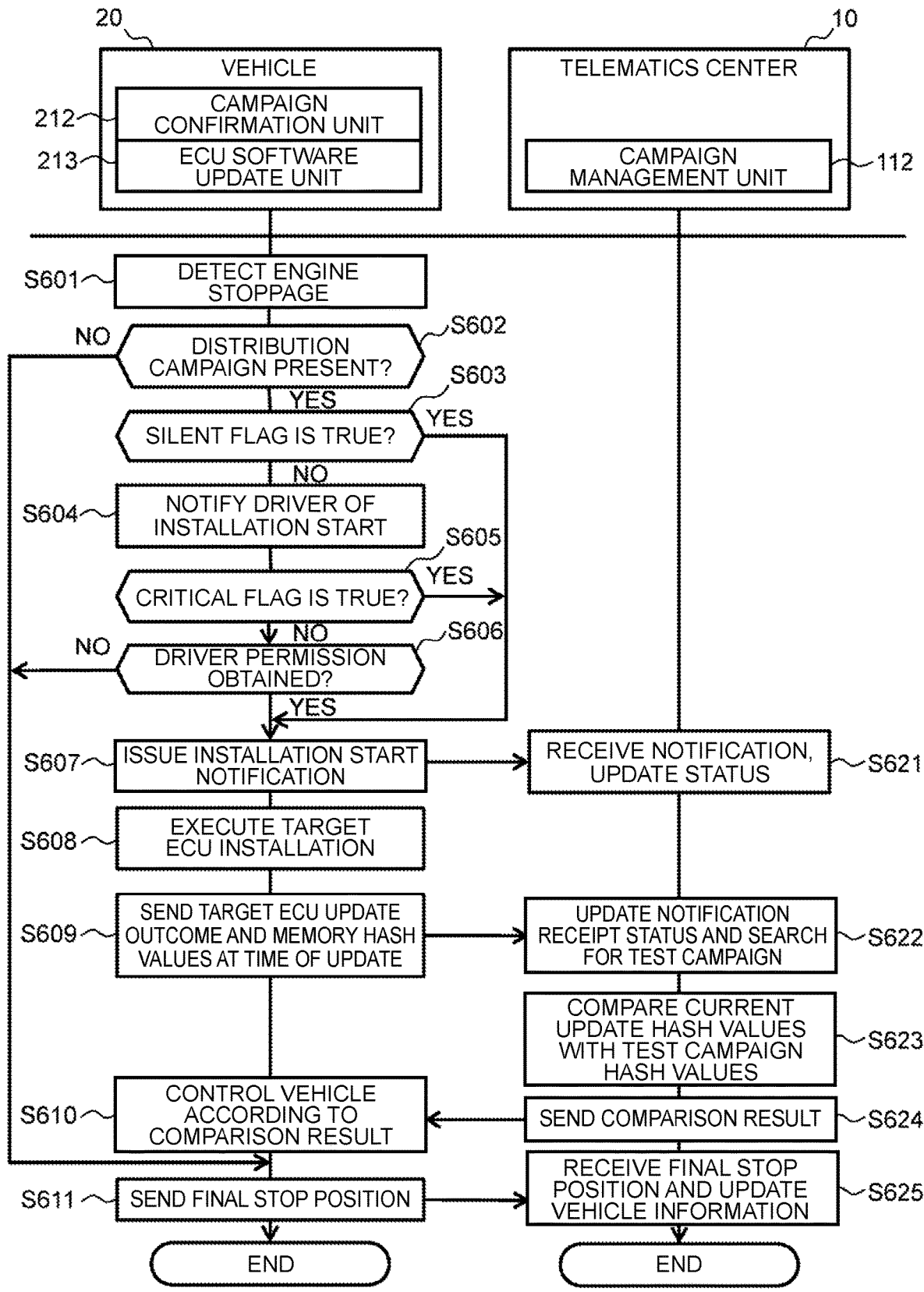
FIG. 14 is (part 2 of) a sequence diagram showing an example of the process steps of update software distribution processing based on a distribution campaign.

FIG. 13 and FIG. 14 are sequence diagrams (parts 1 and 2 thereof) showing an example of the process steps of update software distribution processing based on a distribution campaign. Among these, FIG. 13 shows processing in which vehicle 20 downloads update software from the telematics center 10. Furthermore, FIG. 14 shows processing in which, after the download shown in FIG. 13, vehicle 20 installs the update software on the target ECU and issues notification of this result to the telematics center 10.

The flow of distribution campaign execution will be explained hereinbelow with reference to FIGS. 13 and 14.

First, the update software download processing based on the distribution campaign will be explained with reference to FIG. 13. The processing shown in FIG. 13 is executed by the campaign confirmation unit 212 and update software request unit 213 of the software update apparatus 210 installed in the vehicle 20 and by the campaign management unit 112, update software distribution unit 113 and geocoding processing unit 114 of the central processing unit 110 installed in the telematics center 10.

In step S501 of FIG. 13, the campaign confirmation unit 212 of the vehicle 20 detects engine startup (an ON state) by using information obtained from the engine ECU 241. Upon detecting engine start, the campaign confirmation unit 212 sends an inquiry to the telematics center 10 about the presence of a distribution campaign (the presence of a software update by the distribution campaign) pertaining to the VIN of the vehicle 20 (the VIN 1211 of the vehicle information 1210) (step S502). Furthermore, in step S502, the campaign confirmation unit 212 uses the positioning apparatus 216 to confirm current position information of the vehicle 20 and sends this information to the telematics center 10 together with a campaign inquiry.

In the telematics center 10 which has received the inquiry of step S502, the campaign management unit 112 searches for the vehicle information 1210 by using the VIN of the sending vehicle 20 and updates the final stop position 1213 in the record containing the VIN 1211 of the same value by means of the position information thus received (step S511). In addition, in step S511, the geocoding processing unit 114 uses the map data which is stored in the map DB 128 to specify the address from the received position information and updates the current position region 1215 by means of the region containing the specified address.

Furthermore, the campaign management unit 112 then searches for the update progress status information 1260 and confirms whether a record in which the VIN 1262 matches the VIN of the sending vehicle 20 is present (step S512). The campaign management unit 112 then sends the confirmation result (search result) of step S512 to the vehicle 20 (step S513).

Here, to explain the search result of step S512 in detail, when there is record corresponding to the update progress status information 1260 (a record that the VIN matches) in step S511, the campaign management unit 112 sends, for a distribution campaign search result, the distribution campaign information 1250 corresponding to the distribution campaign ID 1261 of the appropriate record, the silent flag 1217 contained in the vehicle information 1210 corresponding to the VIN 1262 of the appropriate record, the update file name 1245 contained in the test campaign information 1240 corresponding to the reference source test campaign ID 1253 of the foregoing distribution campaign information 1250, and the critical flag 1233 contained in the main campaign information 1230 corresponding to the reference source main campaign ID 1252 of the distribution campaign information 1250 to the vehicle 20 as search results. On the other hand, when there is no appropriate record (record that the VIN matches) corresponding to the update progress status information 1260 in step S511, the campaign management unit 112 sends a search result to the effect that there is no distribution campaign.

Note that, for the search result of step S512, even when there is a record that the VIN matches in the update progress status information 1260 in step S511, when the region in each campaign information item extracted based on the appropriate record (the target region 1244 of the test campaign information 1240 and target region 1254 of the distribution campaign information 1250) does not match the region of the sending vehicle 20 (current position region 1215 of the vehicle information 1210), the campaign management unit 112 preferably sends a search result to the effect that there is no distribution campaign.

In the vehicle 20 which has received a search result from the telematics center 10 (step S503), the campaign confirmation unit 212 confirms whether distribution campaign information 1250 is included in the search result (step S504), and when the distribution campaign information 1250 is not included (NO in step S504), ends the processing because there is no update software to be downloaded. On the other hand, when distribution campaign information 1250 is included (YES in step S504), the update software request unit 213 issues a request to the telematics center 10 to provide the update software specified by the update file name 1245 of the test campaign information 1240 received in combination with the foregoing distribution campaign information 1250 (step S505).

Further, on the telematics center 10 side, upon receiving the request of step S505 (step S514), the update software distribution unit 113 extracts the update software requested from the software DB 127 based on the designated update file name 1245 and sends the update software to the vehicle 20 (step S515).

The update software which was sent in step S515 is received by the vehicle 20 and the download is started (step S506), and the campaign management unit 112 stores the download data of the update software in the storage apparatus 215 (step S507). Further, when the update software download is complete, the campaign management unit 112 issues notification to the telematics center 10 that the download is complete (step S508).

Further, in the telematics center 10, upon receiving (acknowledging) the download completion notification of step S508, the campaign management unit 112 registers the progress of the distribution campaign up until download completion as the status 1263 of the corresponding record in the update progress status information 1260 (step S516).

Thereafter, the campaign management unit 112 sends an instruction to start installing the downloaded update software to the vehicle 20 (step S517).

Further, in the telematics center 10, upon receiving (acknowledging) the installation start instruction of step S516, the campaign confirmation unit 212 shifts to a standby state of awaiting the start of the update software installation until the engine assumes a stop state (OFF state) (step S509). The campaign confirmation unit 212 is able to detect engine stoppage by using information that is obtained from the engine ECU 241. When the engine subsequently enters a stop state, the installation processing is started as shown in FIG. 14.

Distribution campaign-based update software installation processing and result notification processing will be explained next with reference to FIG. 14. The processing shown in FIG. 14 is executed by the campaign confirmation unit 212 and ECU software update unit 214 of the software update apparatus 210 installed in the vehicle 20 and by the campaign management unit 112 of the central processing unit 110 installed in the telematics center 10.

In step S601 of FIG. 14, the campaign confirmation unit 212 of the vehicle 20 detects engine stoppage (an OFF state) by using information obtained from the engine ECU 241. Upon detecting engine stoppage, the campaign confirmation unit 212 confirms whether update software has been stored in the storage apparatus 215, that is, confirms whether distribution campaign information is present (step S602).

When distribution campaign information is not present in the confirmation of step S602 (NO in step S602), because there is no update software to be installed, the campaign confirmation unit 212 ends the current software update processing and finally acquires the current position information from the positioning apparatus 216 of the vehicle 20 and sends this information to the telematics center 10 as the final stop position (step S611).

On the other hand, when distribution campaign information is present in the confirmation of step S602 (YES in step S602), the campaign confirmation unit 212 confirms whether the silent flag 1217 (see step S503 in FIG. 13) received from the telematics center 10 in the download processing of the update software based on the distribution campaign is 'True' (step S603). When the silent flag 1217 is 'True,' (YES in step S603), it is determined that announcing the software update to the driver of the vehicle 20 is unnecessary and the processing advances to step S607 without performing the subsequent steps S604 to S606. On the other hand, when the silent flag 1217 is 'False' (NO in step S603), the campaign confirmation unit 212 displays an announcement to the driver of the vehicle 20 regarding the software update on the input/output apparatus 234 of the navigation terminal 230 (and then starts the installation of the update software) (step S604).

Thereafter, the campaign confirmation unit 212 confirms whether the critical flag 1233 (see step S503 in FIG. 13) received from the telematics center 10 in the download processing of the update software based on the distribution campaign is 'True' (step S605). When the critical flag 1233 is 'True' (YES in step S605), it is determined that the software update urgency is high and that the driver of the vehicle 20 has no right to veto the software update, and the processing advances to step S607 without performing the processing of step S606. On the other hand, when the critical flag 1233 is 'False' (NO in step S605), the campaign confirmation unit 212 displays options to 'perform software update now' or 'perform software update later' on the input/output apparatus 234 of the navigation terminal 230 to obtain permission to install the update software from the driver of the vehicle 20 (step S606).

When the driver chooses to 'perform software update later' in step S606 (NO in step S606), because permission to install the update software has not been obtained, the campaign confirmation unit 212 ends the current software update processing in the vehicle 20 and finally acquires the current position information from the positioning apparatus 216 of the vehicle 20 and sends this information to the telematics center 10 as the final stop position (step S611). In the foregoing case, when the engine stops next time, permission to execute the installation based on step S606 is obtained once again.

When the driver chooses 'perform software update now' in step S606 (YES in step S606), the campaign confirmation unit 212 issues notification to the telematics center 10 regarding the start of the software installation on the update target ECU (step S607).

In the telematics center 10 which has received the notification regarding the start of the installation of step S607, the campaign management unit 112 registers the progress of the distribution campaign up until the start of installation as the status 1263 of the corresponding record in the update progress status information 1260 (step S621).

Further, on the vehicle 20 side, the ECU software update unit 214 executes the software installation of the update target ECU and overwrites the storage apparatus of the ECU (step S608). At this time, the ECU software update unit 214 receives a hash value which is created by regarding the storage apparatus area of the ECU as one binary data in addition to update outcome information from the update target ECU. Furthermore, the ECU software update unit 214 sends the update outcome information acquired from the update target ECU and, in the event of a successful update, the hash value to the telematics center 10 (step S609).

Further, in the telematics center 10 which has received the update outcome information and hash value that were sent in step S609, the campaign management unit 112 registers the progress of the distribution campaign up until installation completion as the status 1263 of the corresponding record in the update progress status information 1260 (step S622).

Furthermore, the campaign management unit 112 extracts the distribution campaign ID 1261 from the record of the update progress status information 1260 registered in step S622, extracts the reference source test campaign ID 1253 from the distribution campaign information 1250 corresponding to the distribution campaign ID 1261, and extracts the verification hash value 1247 contained in the test campaign information 1240 containing the test campaign ID 1241 with the same value as the reference source test campaign ID 1253. The campaign management unit 112 then compares the extracted verification hash value 1247 with the hash value received from the vehicle 20 in step S622 (step S623). Further, the campaign management unit 112 sends the result of the hash value comparison in step S623 to the vehicle 20 (step S624).

Furthermore, in the vehicle 20 which has received the hash value comparison result from the telematics center 10, the campaign confirmation unit 212 implements control of the vehicle 20 according to the comparison result (step S610). To explain this in detail, when the two hash values are the same value, this means that the distribution campaign update software has been installed normally in the same way as at the time of test campaign verification, and hence special control of the vehicle 20 is not implemented. On the other hand, when the two hash values are not the same value, this means that the distribution campaign update software has not been installed normally, and hence predetermined control which is decided beforehand for when installation fails is performed on the vehicle 20. More specifically, for example, restarting the update software installation (step S608) and displaying inquiry contact information on the input/output apparatus 234 of the navigation terminal 230, and so forth, may be considered. The predetermined control when installation fails is not limited to the foregoing example, rather, control to stop the engine of the vehicle 20 or the like, for example, may also be implemented.

Even in cases where any control is implemented by the vehicle 20 in step S610, the campaign confirmation unit 212 then ultimately acquires the current position information from the positioning apparatus 216 of the vehicle 20 and sends this information to the telematics center 10 as a final stop position (step S611).

Furthermore, in the telematics center 10 which has received the final stop position, the campaign management unit 112 extracts the appropriate record of the vehicle information 1210 which contains the VIN 1211 of the target vehicle 20 from the vehicle DB 121 and updates the final stop position 1213 and current position region 1215 in the record (step S625). Note that in updating the current position region 1215, same is overwritten with the current region specified based on the final stop position thus received, but when this region is specified, processing by the geocoding processing unit 114 may also be performed similarly to the processing of step S511 in FIG. 13 above.

Note that, in the in-vehicle software distribution system 1 according to this embodiment, the hash value comparison processing performed in step S623 of FIG. 14 may also be carried out by software update apparatus 210 installed in the vehicle 20 instead of by the campaign management unit 112 of the telematics center 10. In the foregoing case, in the processing performed in step S515 of FIG. 13, in transmitting the update software to the vehicle 20, the telematics center 10 transmits the update software together with the verification hash value 1247 that was registered in the update software test campaign. In such a configuration, because it is possible to determine on the vehicle 20 side and immediately after installation whether the update software has been installed normally, (because there is no need to communicate with the telematics center 10), even when installation has provisionally not completed normally, rapid recovery processing (an installation restart, for example) is to be expected.

As a result of executing the processing of each step shown in FIGS. 13 and 14 hereinabove, execution of the distribution campaign is complete.

The processing of FIGS. 13 and 14 is executed for each of the target vehicles 20 by the distribution campaign. Furthermore, as the update software installation in each of the target vehicles 20 advances, the update completion count 1257 of the distribution campaign information 1250 is updated (the update date and time 1258 is also updated). Further, when the value of the update completion count 1257 is finally the same value as the update target count 1256, this means that the update software installation has been completed normally for all the target vehicles 20 in the distribution campaign, and hence 'update complete' is registered as the status 1263 of the update progress status information 1260 (the update date and time 1264 is also updated).

As explained hereinabove, in the in-vehicle software distribution system 1 according to this embodiment, the telematics center 10 which is the in-vehicle software distribution server manages updates to an identical function by means of a campaign (main campaign) and distributes software based on the campaign remotely in target vehicles of the campaign. More precisely, the campaign management unit 112 categorizes campaign target vehicles into groups based on a predetermined criterion (the test vehicle flag 1216 or current position region 1215, or the like, for example) and creates a plurality of sub-campaigns (a test campaign and distribution campaign and the like) which are subordinate to the campaign for each of the categorized groups; and the update software distribution unit 113 distributes software remotely for each of the sub-campaigns to vehicles targeted by the sub-campaigns based on the sub-campaigns. According to this kind of in-vehicle software distribution system 1, the distribution and installation of update software need not be executed all at once or sequentially to the target vehicles 20 in a distribution campaign (second sub-campaign), rather, update software can be distributed only to a specific vehicle (test vehicle) for verification purposes in a test campaign (first sub-campaign), and update software with a different applied version and update file name and so forth can be distributed according to the current position region of the vehicle 20, and hence control for flexible and not uniform distribution of update software can be implemented in a main campaign.

Moreover, in the in-vehicle software distribution system 1 according to this embodiment, when distribution (and installation) of verification software has succeeded (YES in step S414 of FIG. 12) for a specific test vehicle of a test campaign in one main campaign, a distribution campaign for another target vehicle is created (step S418 in FIG. 12) and a distribution campaign is executed only when the test campaign has succeeded. According to this kind of in-vehicle software distribution system 1, before a general-purpose distribution campaign is executed, efficiency can be confirmed for the distribution (and installation) of update software by means of a test campaign, and hence the safety and reliability of the function update via the campaign can be improved.

Moreover, in the in-vehicle software distribution system 1 according to this embodiment, the hash value acquired from the update target ECU after the software installation in the test campaign is compared with the hash value acquired from the update target ECU after the software installation in the distribution campaign (step S623 in FIG. 14), and by determining that the distribution campaign has succeeded (a normal update software installation) when the two hash values match, the safety and reliability of the function update via the campaign can be improved.

Moreover, as per the campaign management screen 3310 illustrated in FIG. 9, in the in-vehicle software distribution system 1 according to this embodiment, more flexible campaign configuration and execution is possible because selection and modification by the administrator is possible for the configuration of the various campaigns.

(2) Second Embodiment

A second embodiment of the present invention will now be explained. The configuration example of the in-vehicle software distribution system according to the second embodiment is identical to the in-vehicle software distribution system 1 according to the first embodiment illustrated in FIG. 1 and an explanation of the configuration and processing which are common to the first embodiment is omitted here.

The second embodiment differs from the first embodiment in that the processing by the distribution start date and time change unit 115 in the central processing unit 110 which is installed in the telematics center 10 is performed. Therefore, the in-vehicle software distribution system 1 according to the second embodiment will be explained hereinbelow with a focus on processing by the distribution start date and time change unit 115.

(2-1) Creation of Distribution Campaign

Figure 15:
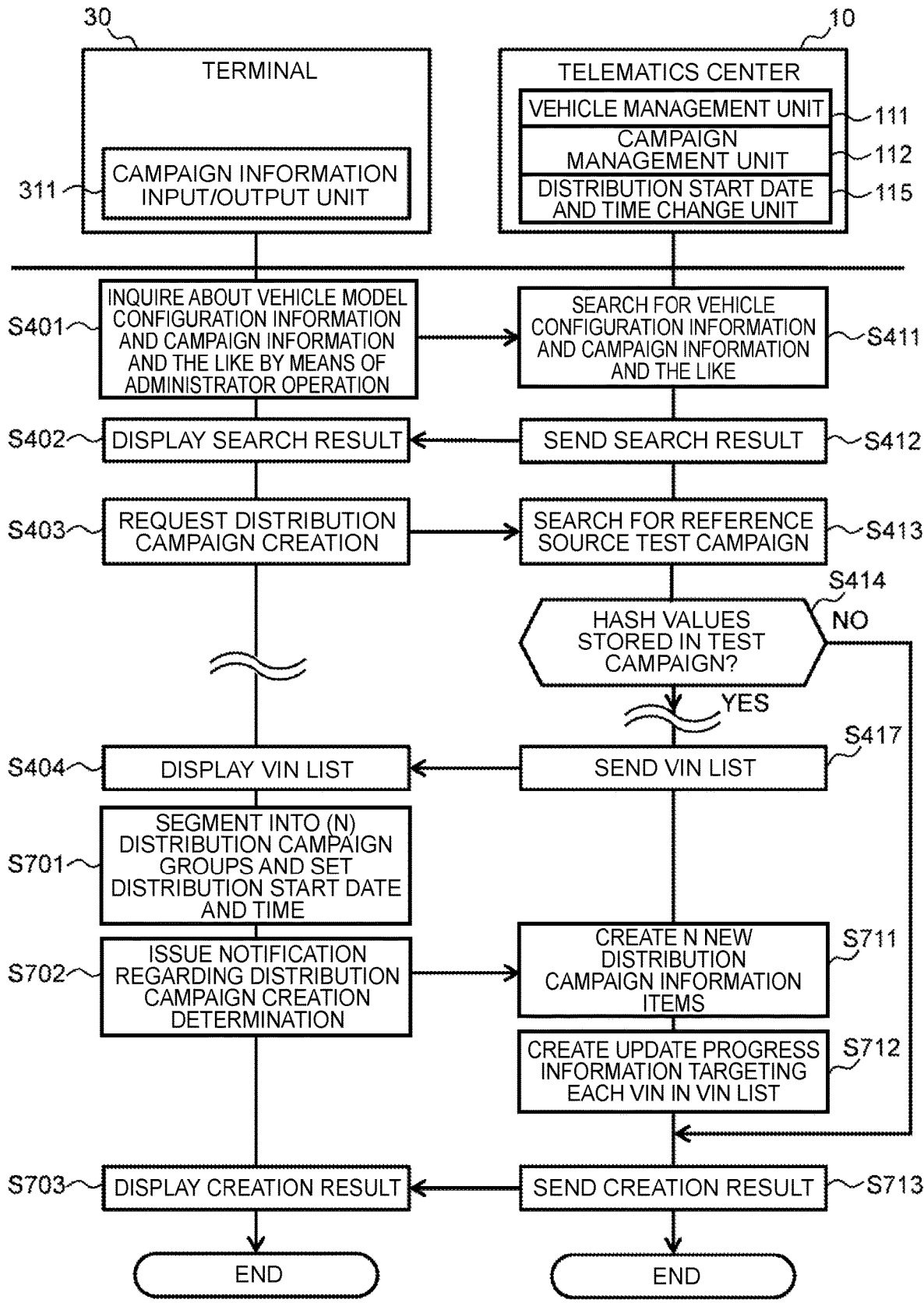
FIG. 15 is a sequence diagram showing an example of the process steps of processing to create distribution campaign information according to a second embodiment.

FIG. 15 is a sequence diagram showing an example of process steps of processing to create distribution campaign information according to the second embodiment. The processing shown in FIG. 15 is executed by the campaign information input/output unit 311 of the central processing unit 310 installed in the terminal 30 and by the vehicle management unit 111, campaign management unit 112 and distribution start date and time change unit 115 of the central processing unit 110 installed in the telematics center 10.

Note that because the processing in FIG. 15 after the processing to create the distribution campaign information is started and until the processing of step S404 by the terminal 30 and the processing of step S417 by the telematics center 10 are performed is the same as the processing of the same steps of the distribution campaign information creation processing explained with reference to FIG. 12 in the first embodiment, an explanation of the former processing is omitted here.

According to FIG. 15, by displaying the VIN list which the campaign information input/output unit 311 received from the telematics center 10 on the input/output apparatus 330 in step S404, information for final confirmation before the distribution campaign is created is shown to the administrator. However, when the administrator confirms the VIN list thus displayed and determines that there is no problem with the target vehicle of the distribution campaign, the administrator performs 'predetermined operations to issue notification to determine the creation of the distribution campaign.' The foregoing predetermined operations include, for example, an operation to designate the number (N) of group segments of the vehicle group with the targeted VIN (all target vehicles of the distribution campaign displayed in the VIN list) and an operation to configure the update software distribution start date and time (distribution start date and time information) for each group, and the like. Specific examples of the 'predetermined operations to issue notification to determine the creation of the distribution campaign' will be explained hereinbelow separately with reference to FIG. 16.

When the foregoing predetermined operations to issue notification to determine the creation of the distribution campaign are performed by the administrator, the campaign information input/output unit 311 segments the vehicle group with the targeted VIN into N groups and configures the distribution start date and time information which differs for each group, based on the foregoing operations (step S701).

Note that as a method for segmenting the vehicle group into N groups, a method in which the administrator operates the input/output apparatus 330 to designate one group at a time, for example, may be considered. Alternatively, a method in which a search for vehicle information 1210 based on the VIN of the vehicle groups is performed and in which results, sorted in order starting with the lowest usage frequency 1218, for example, are used to perform segmentation into the designated number of groups may also be considered.

Thereafter, the campaign information input/output unit 311 sends notification to determine the creation of the distribution campaign for each group among the N groups configured in step 701 to the telematics center 10 (step S702).

In the telematics center 10 which has received the notification to determine the creation of the distribution campaign of step S702, the campaign management unit 112 creates N new distribution campaign information items 1250 in the distribution campaign DB 125 based on the information received in step S413 (step S711).

In addition, by creating the individual records of update progress status information 1260 by means of the respective VIN in the update progress status DB 126 based on the VIN list, the campaign management unit 112 is able to manage each vehicle 20 which is the subject of the progress status in the distribution campaign execution (step S712). Furthermore, at this time, the total number of target vehicles 20 is recorded in the update target count 1234 of the main campaign information 1230 and '0' is recorded in the update completion count 1235.

After the processing of step S419 is complete, the campaign management unit 112 sends the creation result relating to the newly created distribution campaign information 1250 and updated main campaign information 1230 to the terminal 30 (step S713).

In the telematics center 10 which has received the creation result thus sent in step S713, the campaign information input/output unit 311 displays the creation result on the input/output apparatus 330 (step S703).

By performing the processing of each step shown in FIG. 15 hereinabove, the target vehicles 20 can be segmented into a plurality of groups to create a distribution campaign according to the needs of the administrator, and the distribution start date and time which differs for each group (distribution campaign) can be configured.

A more detailed explanation will be provided next for the 'predetermined operations to issue notification to determine the creation of the distribution campaign' in the processing to create the distribution campaign information shown in FIG. 15.

FIG. 16 is a diagram explaining an example of a distribution campaign creation screen. The distribution campaign creation screen 3320 shown in FIG. 16 is a screen which is displayed to make it possible to accept predetermined operations by the administrator when creating a new distribution campaign and which is displayed on the input/output apparatus 330 in the same way as the campaign management screen 3310 illustrated in FIG. 9 in the first embodiment. For example, when operations to create a new distribution campaign are performed via the campaign management screen 3310 (more specifically, when button 3313 and button 3314 have been selected), the distribution campaign creation screen 3320 is displayed on the input/output apparatus 330.

Arranged on the distribution campaign creation screen 3320 of FIG. 16 are a display area 3321 in which information relating to a plurality of distribution target vehicles 20 (a VIN list, for example) is displayed in a table, a display area 3322 in which information relating to the number of distribution campaign segments is displayed, a display area 3323 in which the distribution start date and time of a distribution campaign that is distributed first (a first distribution campaign) is displayed, a display area 3324 in which a time interval for the distribution start date and time (distribution start interval) in a distribution campaign that is distributed second (a second distribution campaign) or the like is displayed, buttons 3325 to 3327 for modifying (configuring) the display content of the display areas 3322 to 3324 respectively, and a button 3328 which is selected when determining the creation of the distribution campaign by means of the display content of the distribution campaign creation screen 3320.

Among the foregoing, the table that is displayed in the display area 3321 is a VIN list that is sortable in order to segment the plurality of distribution target vehicles 20 into N groups according to a predetermined rule. More specifically, this table is obtained by extracting the vehicle ID 1212, current position region 1215, usage frequency 1218 and update date and time 1219 from the vehicle information 1210 for each of the target vehicles 20 (VIN 1211) and displaying the foregoing items, each of which can be sorted in ascending or descending order. In FIG. 16, an example in which the target vehicles 20 are displayed in order of ascending usage frequency.

As the 'predetermined operations for issuing notification to determine the creation of the distribution campaign' by the administrator in the distribution campaign creation screen 3320, sorting is foremost carried out in the display area 3321 and an arrangement in the order desired by the administrator is created so that those target vehicles 20 for which file distribution is to be prioritized are placed toward the top of (in an upper position on) the display area 3321.

Furthermore, after the sorting in the display area 3321 has taken place, it is determined how many distribution campaigns to generate in the display area 3322, that is, into how many groups to segment the distribution target vehicle group (button 3325).

Thereafter, in the display area 3323, a file distribution start date and time is input for a first group whose position is first via a designated sort among the N segmented groups. The first group is a group for which files are to be distributed with the highest priority (first distribution campaign). Thereafter, in the display area 3324, a distribution start time interval for distributing files with some kind of delay after file distribution to the first group is input for groups following the first group (the second group and the like).

The operations in display areas 3321 to 3323 as described above corresponds to 'the predetermined operations for issuing notification to determine the creation of the distribution campaign,' and the distribution campaign group segmentation and configuration of the distribution start date and time for each group, and the like, are performed based on the foregoing operations (step S701 in FIG. 15).

Further, when button 3328 is selected after the foregoing inputs are all complete, notification to determine the creation of N distribution campaigns is sent from the terminal 30 to the telematics center 10 by means of a method which is designated by the administrator (step S702 in FIG. 15).

More specifically, when the vehicle group has been divided into groups according to the display content of the distribution campaign creation screen 3320 in FIG. 16, three groups are each generated in order starting with vehicles of low usage frequency, and for the group with the lowest usage frequency (the first group), new distribution campaign information 1250 in which '2017/11/01-00:00:00' is configured as the distribution start date and time 1255 is created in the distribution campaign DB 125 (first distribution campaign). For the group with the next smallest usage frequency (the second group), new distribution campaign information 1250 in which '2017/11/08-00:00:00' is configured one week after the distribution start date and time of the foregoing group is created as the distribution start date and time 1255 (second distribution campaign), and for the group with the highest usage frequency (the third group), new distribution campaign information 1250 in which '2017/11/15-00: 00:00' is configured yet another week thereafter is created as the distribution start date and time 1255 (third distribution campaign). As a result, the lower the usage frequency of a vehicle among the target vehicles 20, the earlier the distribution start date and time is configured.

Here, in the distribution campaign explained in the first embodiment, for example, when the update software files are distributed all at once to all the target vehicles 20, the load on the telematics center 10 may surge as a result of the concentrated access by the target vehicles 20 all at once straight after the start of distribution. However, in the foregoing in-vehicle software distribution system 1 according to the second embodiment, distribution campaigns can be segmented into a plurality of groups based on the results of sorting the target vehicles of the distribution campaign (sub-campaign) according to a predetermined criterion (the usage frequency 1218, for example), and different software distribution start timings (distribution start dates and times) can be configured for each of the segmented distribution campaigns. By means of this kind of configuration, in the in-vehicle software distribution system 1 according to the second embodiment, the load on the telematics center 10 can be dispersed according to the aims of the administrator, and by prioritizing the distribution to target vehicles 20 with a low usage frequency and limited opportunity for updates, an effect whereby the distribution of update files aimed at fixing problems is reliably executed is to be expected. By prioritizing the distribution to target vehicles 20 with a low usage frequency in particular, an improvement in the campaign completion rate (update progress rate) for the main campaign as a whole can be expected.

Moreover, as described earlier in connection with the display area 3321, the method of sorting the vehicles 20 according to the second embodiment is capable of using not only the usage frequency but rather various data such as the region, vehicle model, and the like. As a result, in order to suppress the load on the telematics center 10, the in-vehicle software distribution system 1 according to the second embodiment is capable of prioritizing updates to the software of specific vehicle models or of prioritizing updates to the software of vehicles which are located in specific regions, and is capable of realizing control of update software distribution more flexibly than in the case of the first embodiment.

(2-2) Changes to the Distribution Start Date and Time

As described hereinabove, the in-vehicle software distribution system 1 according to the second embodiment is capable of suppressing the load on the telematics center 10 by enabling the configuration of different distribution start dates and times for each of the distribution campaigns segmented into a plurality of groups. However, in reality, each distribution campaign may not advance as planned.

Therefore, in the in-vehicle software distribution system 1 according to the second embodiment, the distribution start date and time change unit 115 is able to change the distribution start date and time of the update software in the distribution campaign (distribution start date and time change processing) based on the progress status of other distribution campaigns subordinate to the same main campaign.

Figure 17:
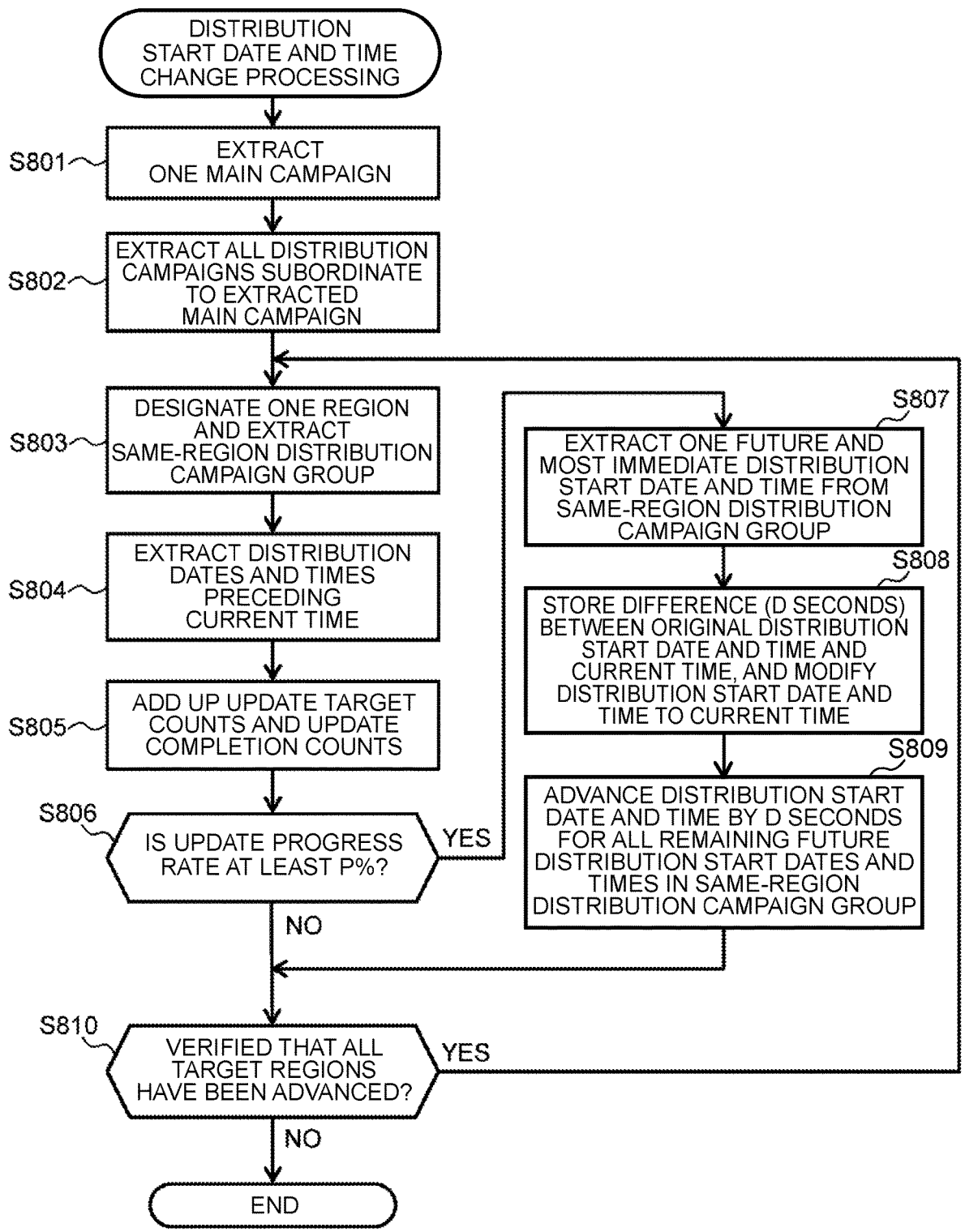
FIG. 17 is a flowchart showing an example of the process steps of distribution start date and time change processing.

FIG. 17 is a flowchart showing an example of the process steps of distribution start date and time change processing. The distribution start date and time change processing shown in FIG. 17 is executed by the distribution start date and time change unit 115 of the central processing unit 110 installed in the telematics center 10.

According to FIG. 17, the distribution start date and time change unit 115 foremost extracts one record of the main campaign information 1230 which is stored in the main campaign DB 123 (step S801).

Further, the distribution start date and time change unit 115 extracts all the distribution campaign information 1250 which is subordinate to the main campaign information 1230 extracted in step S801 from the distribution campaign DB 125 (step S802).

Thereafter, the distribution start date and time change unit 115 designates one region (the designated region) and extracts distribution campaign information (same-region distribution campaign group) for which the target region 1254 matches the designated region from among the distribution campaign information 1250 extracted in step S802 (step S803).

Thereafter, the distribution start date and time change unit 115 extracts distribution campaign groups for which the distribution start date and time 1255 precedes the current time (previous distribution campaign groups of the same region) from among the distribution campaign groups of the same region (step S804).

The distribution start date and time change unit 115 then extracts the update target count 1256 and update completion count 1257 from each of the distribution campaign information items 1250 contained in the same-region previous distribution campaign groups and adds up each of these counts (step S805).

The distribution start date and time change unit 115 then determines whether the 'update progress rate' that is calculated by dividing the 'update completion count sum' calculated in step S805 by the 'update target count sum' is equal to or larger than a predetermined threshold (P % in this example) (step S806). Note that it is assumed that the predetermined threshold 'P %' is configured by the administrator of the telematics center 10. Specific values may be fixed values or variable values that change according to the time interval that has elapsed since the date and time when the distribution campaign was first generated.

When the update progress rate is equal to or larger than P % in step S806 (YES in step S806), because this means that the software distribution is advancing more favorably than the administrator anticipated, distribution campaigns for which distribution has not yet started are effectively accelerated by the processing starting from step S807.

More specifically, one distribution campaign information item for which the distribution start date and time 1255 is ahead of the current time and which is closest to the current time is first extracted from the same-region distribution campaign group extracted in step S803 (step S807). Furthermore, the distribution start date and time 1255 of the distribution campaign information extracted in step S807 is changed to the current time and the difference between the original distribution start date and time and the current time (taken to be 'D seconds') is stored (step S808). Furthermore, all distribution campaign information items which were not extracted in step S807 but for which the distribution start date and time 1255 is ahead of the current time are extracted from the same-region distribution campaign group extracted in step S803 and are changed to distribution campaign information items with a distribution start date and time 1255 which is 'D seconds' earlier (step S809).

As a result of the foregoing processing of steps S807 to S809, all of the distribution campaigns for which the distribution start date and time has not yet arrived in the same-region distribution campaign group can have their distribution start date and time advanced by 'D seconds'

(advancement processing). Thereafter, the processing of step S810 is performed. Note that when the update progress rate is less than P % in step S806 (NO in step S806), this means that the software distribution is not necessarily advancing at a rate exceeding the administrator's expectations and advancement is deemed unnecessary, and hence the processing advances to the processing of step S810 without executing the processing of steps S807 to S809.

Further, in step S810, the distribution start date and time change unit 115 confirms whether the processing of steps S803 to S809 has been performed by designating, as designated regions, all the target regions 1254 contained in the distribution campaign information 1250 that was extracted in step S802. That is, the foregoing confirmation involves confirming whether advancement processing has been verified for all the target regions.

When target regions for which advancement processing has not been verified remain in step S810 (NO in step S810), the processing is repeated by returning to step S803 and changing the designated region. On the other hand, when verification of advancement processing for all the target regions has been confirmed in step S810 (YES in step S810), the distribution start date and time change unit 115 ends the processing.

Note that, although the processing illustrated in FIG. 17 is processing which performs modification of the distribution start date and time for one main campaign that was extracted in step S801, in the in-vehicle software distribution system 1 according to the second embodiment, as a result of repeating this processing at regular intervals, the telematics center 10 is able to update the information of the same main campaign once again or is able to change the distribution start date and time of all the other main campaigns.

As mentioned hereinabove, in the in-vehicle software distribution system 1 according to the second embodiment, by performing the foregoing distribution start date and time change processing, when any of distribution campaigns that were executed beforehand among the distribution campaigns that have been segmented into groups has ended early, the execution (distribution start date and time) of unexecuted distribution campaigns can be advanced. Thus, with the in-vehicle software distribution system 1 according to the second embodiment, based on the actual progress status of a distribution campaign, the distribution start date and time of another distribution campaign can be advanced without placing an excessive burden on the telematics center 10 and more flexible distribution control than for the in-vehicle software distribution system according to the first embodiment can be executed. Moreover, not only is it possible to suppress an increase in the load on the telematics center 10 as a result, but also an effect whereby on the whole software distribution is completed early is to be expected.

Note that the present invention is not limited to or by the foregoing embodiments and encompasses a variety of modification examples. For example, the foregoing embodiments have been explained in detail in order to provide an explanation that facilitates understanding of the present invention, but are not necessarily limited to embodiments that comprise all the configurations thus explained. For example, a portion of the configuration of each embodiment can have other configurations added thereto, removed or replaced.

Moreover, each of the foregoing configurations, functions, processing units and processing means and so forth may also be realized by means of hardware by designing a portion or all of the foregoing configurations and so forth by means of an integrated circuit, for example. Furthermore, each of the foregoing configurations and functions and so forth may also be realized by software as a result of a processor interpreting and executing a program which realizes the respective functions. The information of the programs, tables, files and the like representing each of the functions can be placed on recording apparatuses such as memory, hard disks and SSD (Solid State Drives), or on recording media such as IC cards, SD cards and DVDs.

Moreover, control lines and information lines and the like as deemed necessary for an explanation are shown but not all the control lines and information lines in a product are necessarily shown. Almost all the configurations may be regarded as being mutually connected in their implementation.

REFERENCE SIGNS LIST 1 in-vehicle software distribution system
10 telematics center
20 vehicle
30 terminal
40 network
110 central processing unit
111 vehicle management unit
112 campaign management unit
113 update software distribution unit
114 geocoding processing unit
115 distribution start date and time change unit
120 storage apparatus
121 vehicle DB
122 vehicle configuration DB
123 main campaign DB
124 test campaign DB
125 distribution campaign DB
126 update progress status DB
127 software DB
128 map DB
130 communication unit
210 software update apparatus
211 central processing unit
212 campaign confirmation unit
213 update software request unit
214 ECU software update unit
215 storage apparatus
216 positioning apparatus
220 communication unit
230 navigation terminal
231 central processing unit
232 update information display portion
233 storage apparatus
234 input/output apparatus
241 engine ECU
242 self-driving ECU
310 central processing unit
311 campaign information input/output unit
320 storage apparatus
330 input/output apparatus
340 communication unit
1210 vehicle information
1220 vehicle configuration information
1230 main campaign information
1240 test campaign information
1250 distribution campaign information
1260 update progress status information

The invention claimed is:

1. An in-vehicle software distribution system which controls updates to an identical function for in-vehicle systems of a plurality of vehicles, comprising:

an in-vehicle software distribution server which manages updates to the identical function according to a main campaign and distributes software remotely to the plurality of vehicles that are the distribution destinations of the main campaign;
a terminal which performs input/output (I/O) to/from the in-vehicle software distribution server; and
a software update apparatus which is mounted in each of the plurality of vehicles that downloads the software that has been distributed by the in-vehicle software distribution server, and installs the software in target in-vehicle systems,
wherein the in-vehicle software distribution server includes a processor coupled to a memory storing instructions that when executed configure the processor to:
categorize the plurality of vehicles that are the distribution destinations of the main campaign into groups based on a predetermined criterion and create a plurality of sub-campaigns which are subordinate to the campaign for each of the categorized groups; and
distribute, for each of the sub-campaigns, software remotely to vehicles targeted by the sub-campaigns based on the sub-campaigns,
wherein the processor is further configured to:
create a first test sub-campaign that is subordinate to the main campaign which distributes verification software to a group of specific vehicles used for verification of an update software distribution test among the plurality of vehicles that are the distribution destinations of the main campaign; and
create a second distribution sub-campaign which distributes software to a group of vehicles among the plurality of vehicles that are the distribution destinations of the main campaign other than the specific vehicles,
wherein, upon verification of a successful result of the update software distribution test of the first test sub-campaign, the processor creates the second sub-campaign which is subordinate to the main campaign, and
wherein the processor is further configured to perform the software distribution to the group of vehicles targeted by the second sub-campaign only upon the successful result of the update software distribution test of the specific vehicles of the first sub-campaign.

2. The in-vehicle software distribution system according to claim 1, wherein the software update apparatus includes a processor and, in the specific vehicles to which the verification software has been distributed by the first sub-campaign, after the verification software has been installed in the target in-vehicle systems, the processor of the software update apparatus acquires a hash value of a storage apparatus area of the in-vehicle systems and sends the hash value to the in-vehicle software distribution server,
wherein, in the target vehicles to which the software has been distributed by the second sub-campaign, after the software has been installed in the target in-vehicle systems, the processor of the software update apparatus acquires a hash value of a storage apparatus area of the in-vehicle systems and sends the hash value to the in-vehicle software distribution server, and
wherein, upon the hash value received in the second sub-campaign matches the hash value received in the first sub-campaign, the processor of the in-vehicle software distribution server is configured to determine that the successful result of the update software distribution test of the specific vehicles of the second sub-campaign is confirmed.

3. The in-vehicle software distribution system according to claim 1, wherein the processor is further configured to segment the second sub-campaign into a plurality of segmented second sub-campaigns based on results obtained by sorting the target vehicles of the second sub-campaign according to a predetermined criterion and of configuring different software distribution start timings for each of the segmented second sub-campaigns.

4. The in-vehicle software distribution system according to claim 3, wherein the processor is further configured to segment the second sub-campaign into a plurality of segmented second sub-campaigns based on results obtained by sorting the target vehicles of the second sub-campaign in order of ascending usage frequency of the target vehicles, and among the segmented second sub-campaigns, the lower the usage frequency of the target vehicles, configure an earlier software distribution start timing.

5. The in-vehicle software distribution system according to claim 3,
wherein, in executing the plurality of segmented second sub-campaigns, the processor is configured to advance the software distribution start timing of the unexecuted second sub-campaigns when any of the second sub-campaigns that were executed beforehand has ended.

6. The in-vehicle software distribution system according to claim 1,
wherein the processor is further configured to categorize the plurality of vehicles that are the distribution destinations of the main campaign into groups based on a region of each of the plurality of vehicles and create regional sub-campaigns which are subordinate to the main campaign.

7. The in-vehicle software distribution system according to claim 6, wherein the software update apparatus further comprises a positioning apparatus which acquires current position information of its own vehicle, wherein the processor of the in-vehicle software distribution server is further configured to
specify the region during distribution of each target vehicle of the main campaign based on the position information acquired by the positioning apparatus of the target vehicle,
categorize the plurality of vehicles that are the distribution destinations of the main campaign into the groups based on the region which has been specified by the geocoding processing unit,
and create a plurality of sub-campaigns which are subordinate to the main campaign for each of the segmented groups.

8. An in-vehicle software distribution server which manages updates to an identical function according to a main campaign for in-vehicle systems of a plurality of vehicles and distributes software remotely to the plurality of vehicles that are the distribution destinations of the main campaign, comprising:
a processor coupled to a memory storing instructions that when executed configure the processor to:
categorize the plurality of vehicles that are the distribution destinations of the main campaign into groups based on a predetermined criterion and create a plurality of sub-campaigns which are subordinate to the campaign for each of the categorized groups; and distribute, for each of the sub-campaigns, software remotely to vehicles targeted by the sub-campaigns based on the sub-campaigns, wherein the processor is further configured to:
create a first test sub-campaign that is subordinate to the main campaign which distributes verification software to a group of specific vehicles used for verification of an update software distribution test among the plurality of vehicles that are the distribution destinations of the main campaign; and
create a second distribution sub-campaign which distributes software to a group of vehicles among the plurality of vehicles that are the distribution destinations of the main campaign other than the specific vehicles,
wherein, upon verification of a successful result of the update software distribution test of the first test sub-campaign, the processor creates the second sub-campaign which is subordinate to the main campaign, and
wherein the processor is further configured to perform the software distribution to the group of vehicles targeted by the second sub-campaign only upon the successful result of the update software distribution test of the specific vehicles of the first sub-campaign.

9. The in-vehicle software distribution server according to claim 8,
wherein the processor is further configured to:
segment the second sub-campaign into a plurality of segmented second sub-campaigns based on results obtained by sorting the target vehicles of the second sub-campaign according to a predetermined criterion and of configuring different software distribution start timings for each of the segmented second sub-campaigns.

10. An in-vehicle software distribution method of an in-vehicle software distribution system which controls updates to an identical function for in-vehicle systems of a plurality of vehicles, wherein the in-vehicle software distribution system comprises:
an in-vehicle software distribution server which manages updates to the identical function according to a main campaign and distributes software remotely to a plurality of vehicles that are the distribution destinations of the main campaign;
a terminal which performs input/output (I/O) to/from the in-vehicle software distribution server; and
a software update apparatus which is mounted in each of the plurality of vehicles, downloads the software that has been distributed by the in-vehicle software distribution server, and installs the software in target in-vehicle systems, wherein the in-vehicle software distribution server performs the steps of:
categorizing, in a main campaign creation step, the plurality of vehicles that are the distribution destinations of the main campaign into groups based on a predetermined criterion and creating a plurality of sub-campaigns which are subordinate to the campaign for each of the categorized groups;
distributing, for each of the sub-campaigns, software remotely to vehicles targeted by the sub-campaigns based on the sub-campaigns,
creating a first test sub-campaign that is subordinate to the main campaign which distributes verification software to a group of specific vehicles used for verification of an update software distribution test among the plurality of vehicles that are the distribution destinations of the main campaign; and
creating a second distribution sub-campaign which distributes software to a group of vehicles among the plurality of vehicles that are the distribution destinations of the main campaign other than the specific vehicles,
wherein, upon verification of a successful result of the update software distribution test of the first test sub-campaign, the second sub-campaign which is subordinate to the main campaign is created in the creating of the second distribution sub-campaign, and
wherein distributing the software to the group of vehicles targeted by the second sub-campaign only upon confirming the successful result of the update software distribution test of the specific vehicles of the first sub-campaign.

11. The in-vehicle software distribution method according to claim 10, wherein, in the main campaign creation step,
the in-vehicle software distribution server segments the second sub-campaign into a plurality of segmented second sub-campaigns based on results obtained by sorting the target vehicles of the second sub-campaign according to a predetermined criterion and configures different software distribution start timings for each of the segmented second sub-campaigns.

\* \* \* \* \*